United States Patent
Edstrom et al.

[11] 3,725,655
[45] Apr. 3, 1973

[54] MEDIA TRANSPORT PERFORMANCE MEASUREMENTS

[75] Inventors: Gene H. Edstrom, Longmont; Edward P. Lutter, Boulder, both of Colo.

[73] Assignee: International Business Machines Corporation, Armonk, N.Y.

[22] Filed: June 24, 1971

[21] Appl. No.: 156,216

[52] U.S. Cl............235/151.32, 340/174.1 R, 444/1
[51] Int. Cl.............................................G06f 15/20
[58] Field of Search ...235/151.32; 444/1; 340/172.5; 346/74 M; 340/174.1 R, 174.1 A, 174.1 B; 318/603; 324/186, 187, 181

[56] References Cited

UNITED STATES PATENTS

| | | | |
|---|---|---|---|
| 3,364,495 | 1/1968 | McFadden et al. | 346/74 M |
| 3,400,385 | 9/1968 | Jorgensen et al. | 340/174.1 R X |
| 3,444,541 | 5/1969 | Irwin | 340/174.1 R |
| 3,571,685 | 3/1971 | Akins et al. | 318/603 |
| 3,665,309 | 5/1972 | Sato et al. | 324/186 |

OTHER PUBLICATIONS

Keffeler – "Interblock Gap Measurements"– IBM Technical Disclosure Bulletin – Vol. 13, No. 8, January 1971, page 2,246

*Primary Examiner*—Joseph F. Ruggiero
*Attorney*—Herbert F. Somermeyer et al.

[57] ABSTRACT

Displacement between two signals on a record media is precisely measured by counting the number of capstan tachometer signals occurring between the two signals. This count is time metered per tachometer cycle to calculate an average velocity. In addition, elapsed times between immediately adjacent tachometer signal changes and the signals are measured. The average velocity per tachometer cycle is then multiplied by the total number of tachometer cycles and those portions of a tachometer cycle occurring adjacent the signals. With the known distance per tachometer cycle, the total elapsed time is a precise indication of the distance between the two signals. This method is also used for measuring media slip. Upon occurrence of a first signal, the media is stopped. After stopping, the media is started, all the while measuring the distance the media is moved. Distance measured at a constant velocity is then compared with the latter measurement to indicate slip.

25 Claims, 11 Drawing Figures

3,725,655

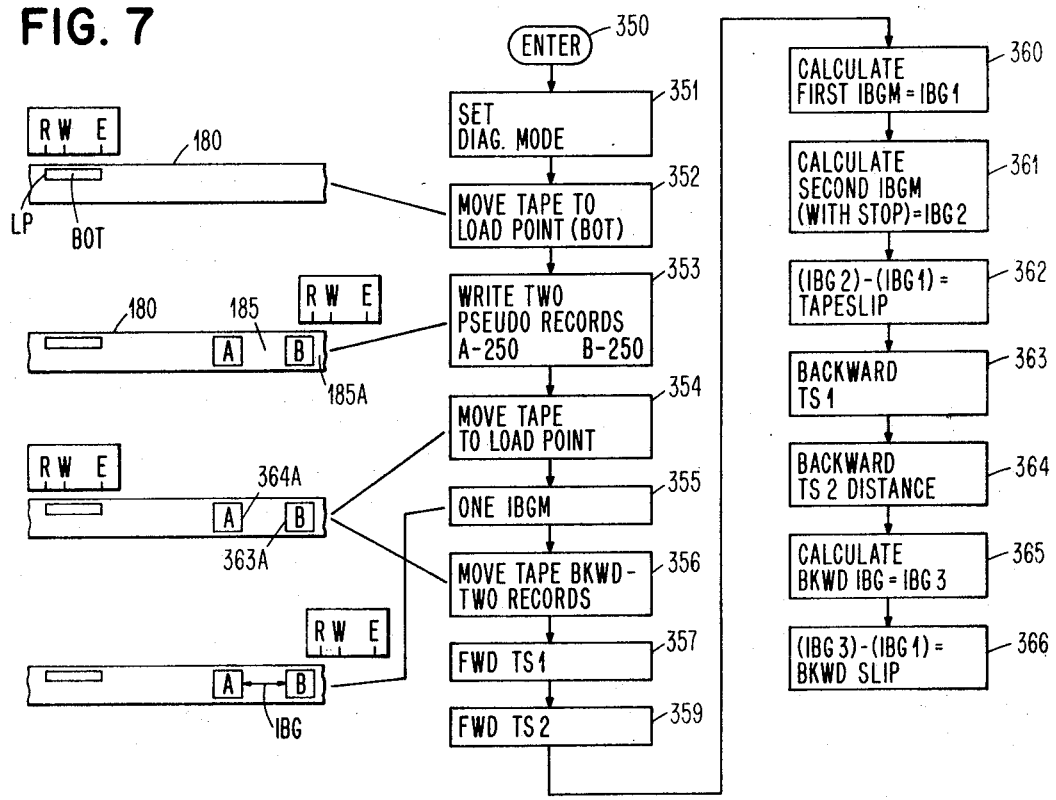
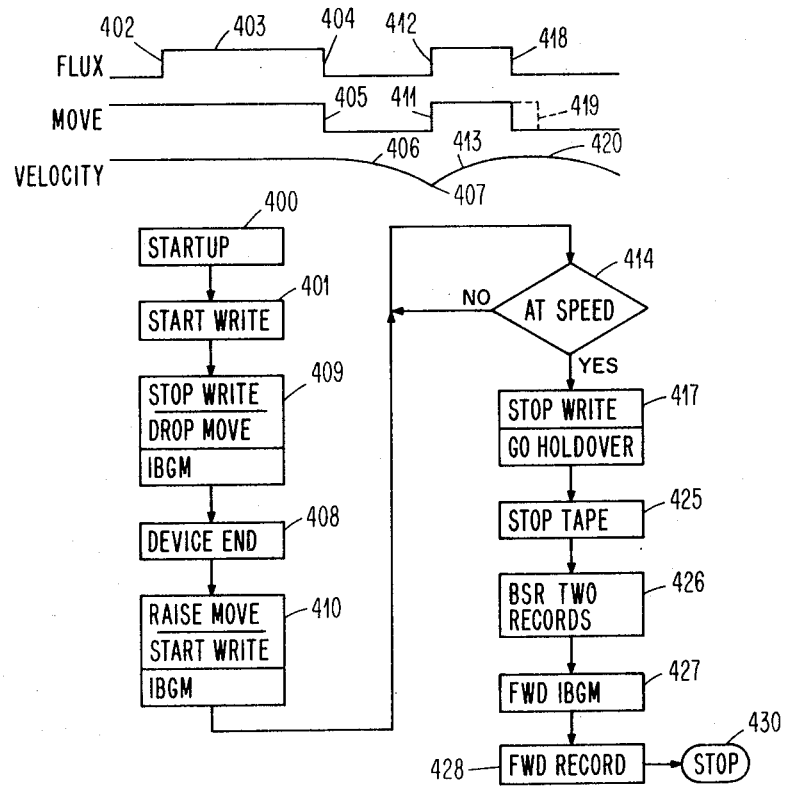

MEDIA TRANSPORT PERFORMANCE MEASUREMENTS

DOCUMENTS INCORPORATED BY REFERENCE FOR INFORMATIONAL PURPOSES

1. USA Standard X3.221967, "Recorded Magnetic Tape for Information Interchange" (800 cpi, NRZI).
2. Proposed American National Standard--Recorded Magnetic Tape for Information Interchange" (1,600 cpi, Phase Encoded), Communications of the ACM, Volume 13, No. 11, November 1970, pages 679–686.
3. U. S. Pat. No. 2,734,186 (phase-encoded recording).
4. U. S. Pat. No. 3,303,476 (digital interfaces).
5. U. S. Pat. No. 3,336,582 (CPU channel commands to control unit).
6. U. S. Pat. No. 3,372,378 (a switching system for a data processing system).
7. U. S. Pat. No. 3,400,371 (a CPU).
8. U. S. Pat. No. 3,550,133 (a channel).
9. U. S. Pat. No. Application of John W. Irwin, Ser. No. 77,088; filed Oct. 1, 1970; entitled "Microprogrammable I/O Controller;" and commonly assigned, now U.S. Pat. No. 3,654,617.

BACKGROUND OF THE INVENTION

The present invention relates to methods and apparatus for measuring performance of media transport, particularly magnetic tape transports. The same techniques can be used to measure relative motions between two relatively movable members of any sort.

In digital tape transports, of the type used in data processing systems, data is usually recorded in so-called blocks. An IBG (interblock gap) is intermediate adjacent data blocks. Each IBG is an erased portion of the tape. These IBG's take up a major portion of the media and are used to format record signals on the media. Usually, it is desirable to keep the IBG's to specification as closely as possible. For example, if a 0.5 inch IBG is desired, a slow tape drive may cause the IBG to stretch to 0.75 inches. This not only wastes record media space, but also degrades performance in that additional time is required from start-up of the tape drive until the first signals can be read; i.e., read access time is undesirably increased.

When record media such as magnetic tape is to be used on a plurality of different tape drives or magnetic tape units (MTU's), it becomes more and more important as the performance of the various drives is increased to maintain the IBG to specification. If the IBG is too short, the slowest tape drive in an installation may not be able to accelerate the tape fast enough to reach operating velocity before a first record signal is encountered. This can cause a so-called permanent error. Such an error is tape-drive caused rather than media caused, indicating that the tape drive should be adjusted or retrofitted for improved performance.

As stated above, it is desirable to keep IBG's as small as possible. In the past, the length of an IBG has been largely determined by the acceleration characteristics of available tape drives. As newer motors and better-designed tape drives become available, it is possible to shorten the IBG even more—for example, down to 0.2 inch. With this short an IBG, a small variation of IBG length has a more pronounced effect on total system performance in that a small change is a greater percentage change in a small IBG than in a longer IBG. Therefore, it is desirable to precisely measure the length of IBG's.

A prior method of measuring IBG's is shown in the January 1971 issue of the IBM TECHNICAL DISCLOSURE BULLETIN in an article by J. R. Keffeler, entitled "Interblock Gap Measurements," appearing on page 2,246. Essentially, Keffeler teaches that by metering the time between an end of data (EOR) and the start of data (BOR) of a downstream data block, an indication of the IBG length may be obtained. This method is satisfactory wherein velocity variations are minimized and the actual velocity of the media is known. However, in most tape drives, a capstan frictionally engaging the media transports the media past a transducer. Velocity of the tape is not only a function of the rotational velocity of the capstan, but also the frictional engagement between the tape and the capstan. This relationship may vary during acceleration and deceleration. In most MTU's used in data processing systems, for smoothness of operations, DC motors are used as opposed to synchronous motors. It is well known that the velocity control of the DC motor, while it may be precise enough for many applications, is subject to enough variation that substantial errors in IBG length measurement may occur in the above-mentioned Keffeler system. Accordingly, for high-performance MTU's, it is highly desirable that a more precise method of IBG measurement be provided.

As also mentioned above, the frictional engagement between the tape-transporting capstan and the tape itself is a material factor in tape velocity. Any relative motion is called tape slip. Because of asymmetry in tape paths in today's MTU's, the tape slip in one direction (forward) may be different than in the other direction (backward). It is desirable that this factor be ascertainable through automatic diagnostics controlled by a CPU for pointing to tape drive errors. Maintenance personnel then may quickly and inexpensively upgrade MTU performance to desired specification.

SUMMARY OF THE INVENTION

It is an object of the present invention to provide a precise method and apparatus for metering distance on a record member occurring between two signals thereon.

It is a further object to provide methods and apparatus for measuring slippage between two relatively movable members by jointly measuring time and distance of a driving member in a succession of predetermined operations.

In practicing the invention in its preferred form, an IBG or other distance between two signals or marks on one member relatively movable with respect to another member is measured by metering elapsed time from a first signal until occurrence of a first-occurring predetermined displacement indicating signal related to relative movement of the two members. The elapsed time measurement is stored. Then, the number of displacement signal portions occurring between the two marks or signals is tallied together with the time elapsed between successive ones of the displacement signals in order to ascertain average relative velocity.

The time elapsed between the last-occurring displacement signal and the second signal is measured and added to the first time measurement. This total time is divided by the average velocity to obtain a number indicating the number of displacement signal cycles represented by the two end time measurements. To obtain the distance, this number is then added to the tally of displacement signal cycles and that number of cycles is multiplied by the known distance of the relative movement represented by each displacement signal portion.

The above-preferred method is particularly useful in MTU's when one of the relatively movable members is a magnetic media or tape and the second relatively movable member is a transducer arranged to sense signals or marks on the media. A capstan having a tachometer generating displacement signals moves the tape past the transducer for effecting the steps of the method. A microprogrammable control unit (CU) and a CPU (central processing unit) may be connected to the MTU for automatically making the measurements and diagnosing MTU performance.

In addition to the above-preferred method, slippage between two relatively movable members may be measured. First and second signals are recorded or marks are made on one of the members. Relative movement is effected between the two members until detection of the first signal. Then, the relative movement is stopped just beyond the first signal. The distance is measured as above indicated. Then, the relative movement is again initiated and the distance measured until the second signal is detected. This gives a distance measurement based upon relative deceleration and acceleration between the two members. Additionally, the distance between the two signals is measured as first stated. The difference in the indicated distances represents slippage between the two relatively movable members during acceleration/deceleration.

The above measurements can be made in either direction of motion and are preferably usable with an MTU for measuring tape slip with respect to a transducer.

Included in the invention is a novel apparatus and data processing system for effecting the above-described methods.

The foregoing and other objects, features, and advantages of the invention will be apparent from the following more particular description of preferred embodiments of the invention, as illustrated in the accompanying drawings.

THE DRAWINGS

FIG. 7 is a simplified flow diagram of a computer program usable to effect the measurements described with respect to FIG. 1 using the FIG. 2 illustrated system.

Figure 2:
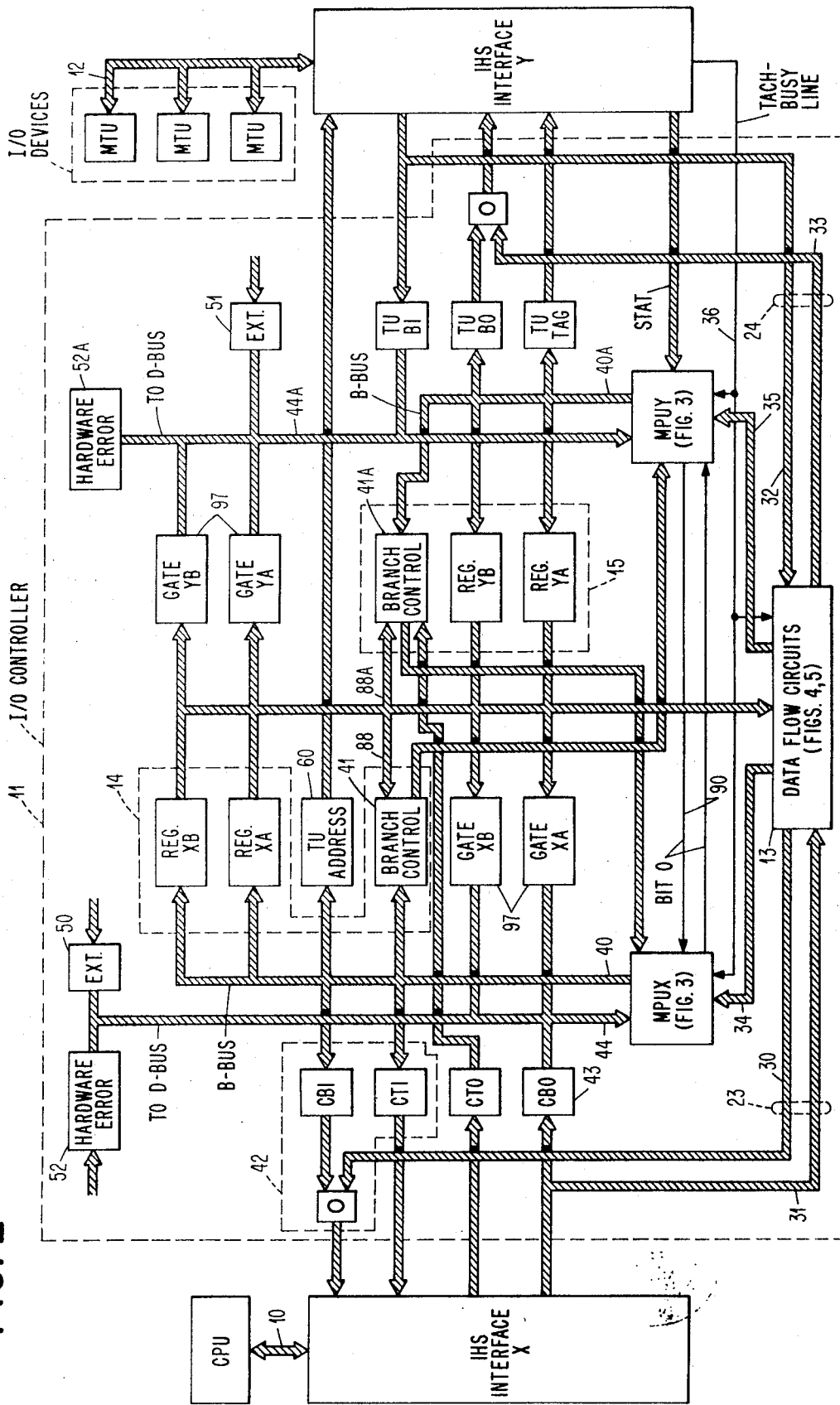
FIG. 2 is a simplified block signal flow diagram of a system utilizing the present invention.
Figure 9:
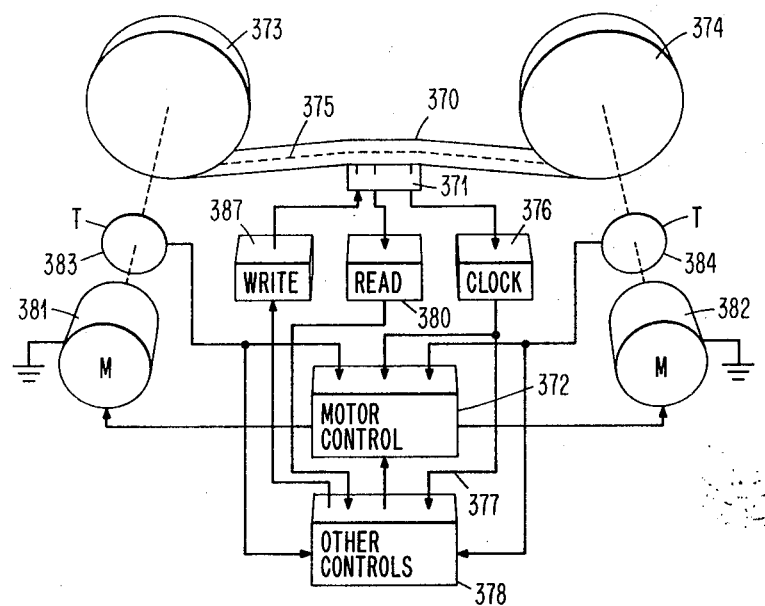

FIG. 9 diagrammatically shows an alternative MTU particularly adaptable for use in the FIG. 2 illustrated system, but using the media as a source of displacement indicating signals.

FIG. 10 is a chart illustrating selected alternative methods of practicing the invention.

DETAILED DESCRIPTION

Preferred Method (IBGM)

Figure 1:
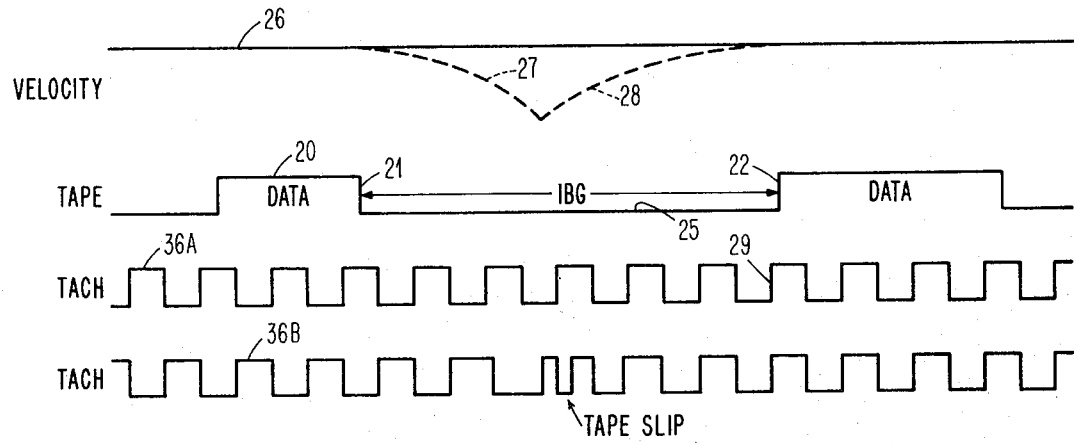
FIG. 1 is a set of diagrammatic waveforms used to illustrate the methods of the present invention.
Figure 4:
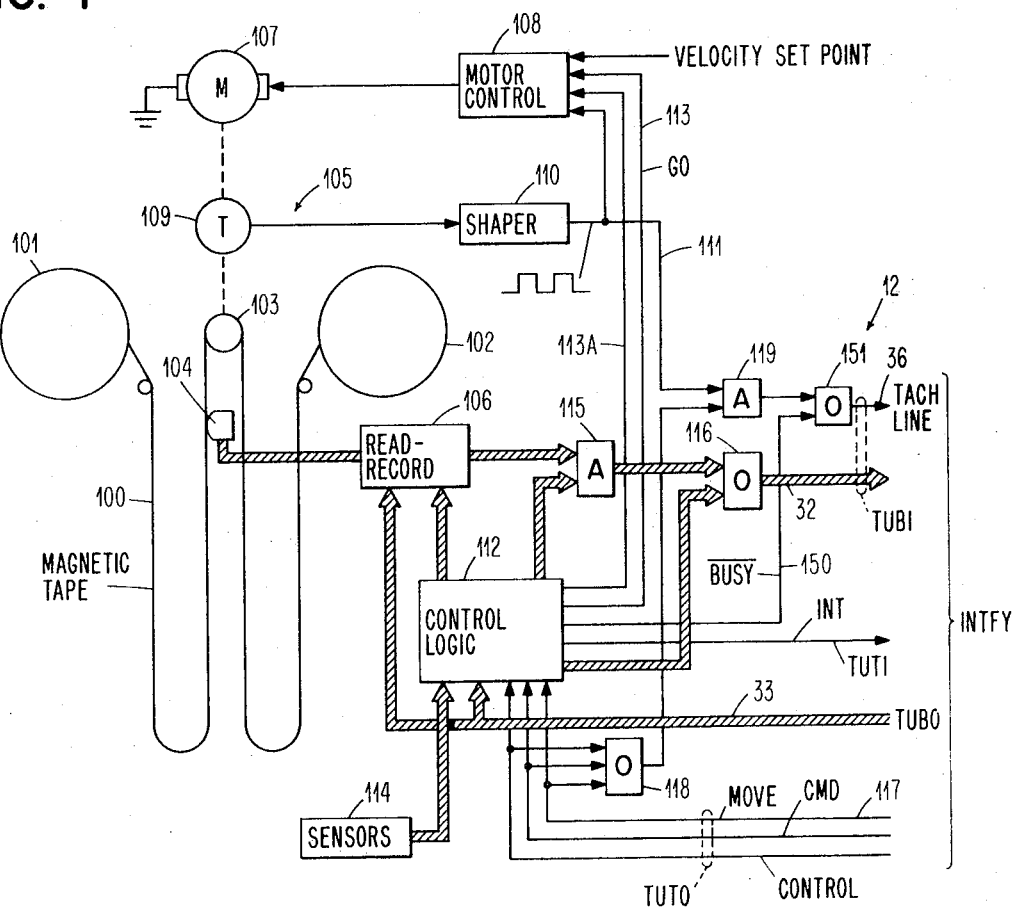
FIG. 4 is a simplified diagrammatic showing of an MTU usable with the FIG. 2 illustrated system in connection with practicing the present invention.

With particular reference now to FIGS. 1 and 4, a synopsis of the preferred methods of the present invention is presented. In FIG. 4, magnetic tape 100 is moved past transducer 104 by tape driving capstan 103. Direction and velocity are controlled by control logic 112 via motor control 108 as will be later described. Tape 100 is transported between tape-containing reels 101 and 102 and through vacuum buffer loops as shown in FIG. 4. The tape velocity past transducer 104 is largely under control of tape transporting capstan 103 in both directions of tape movement. Capstan 103 is driven by motor 107 having digital tachometer 109 (later described) indicating rotation of capstan 103. Assuming there is no tape slip between capstan 103 and tape 100, tachometer 109 indicates the true distance tape 100 is transported past transducer 104.

In FIG. 1, signals from tachometer 109 are shown as idealized wave 36A. Wave 36A represents tachometer (tach) signals at a constant velocity of motor 107 and represents the tachometer 109 output signal when measuring IBG 25 when MTU is operating at the design velocity 26. Signals recorded on magnetic tape 100 are represented by recorded readback signal envelope 20. On media 100, the two data blocks are separated by IBG 25. In the forward direction of motion, tape is moving to the left as viewed in FIG. 1 wherein the upstream data block has an end of record (EOR) 21 indicating the beginning of IBG 25. This is indicated in a readback signal by loss of signal envelope amplitude. In a similar manner, the downstream data block has a beginning of record (BOR) 22 signified by an increase in readback signal amplitude. The distance between EOR 21 and BOR 22 is the IBG length. When the tape is moving at constant design velocity 26, there should be insignificant (if any) tape slippage with respect to rotating capstan 103; the number of tachometer signal portions 36A in IBG 25 providing a precise measurement of the IBG length as will be described.

For measuring tape slip, there are two additional measurements of IBG 25 called TS-1 and TS-2. In TS-1, tape 100 is moved past the transducer in the forward direction up to EOR 21. The tape MOVE tag (as will be described) is dropped at EOR 21 with the tape velocity following velocity profile 27 until the tape stops approximately in the center of IBG 25. The change in tachometer signal frequency is shown by waveform 36B, with the distance between successive transitions of the tachometer signal (frequency is decreasing) lengthening as the velocity decreases. It must be appreciated that the number of tach signal cycles is greatly reduced from that actually found in a practical embodiment.

Portion TS-2 is initiated after tape 100 has stopped. MOVE tag is raised for a TS-2 measurement indicated by increasing velocity profile 28 and increasing frequency of tachometer signals. Because of tape slip, the actual number of cycles occurring within IBG 25 in signal 36B may be greater (as shown) than the number occurring in signal 36A.

In FIG. 1, IBG 25 length is the reference along the horizontal coordinate rather than time. Tape slip can occur in either deceleration or acceleration. By comparing the sum of TS-1 and TS-2 measurements with the above-described measurement mode at constant velocity, this indicates the amount of tape slip between capstan 103 and tape 100. It is desirable to measure slip in both directions of tape motion because of the asymmetrical tape path of the drive shown in FIG. 4.

In summary, the method of the present invention includes metering the distance between two marks on one of two relatively movable members at a constant velocity and then measuring the same distance while in a decelerating/accelerating mode. The difference between the two measurements is indicative of slippage.

In making the precise measurements, a microprogram time clock is started on detection of EOR 21. This time clock runs until detection of the first positive transition in signal 36A. The metered time is then recorded in either a control unit (CU) or a CPU. Subsequently, time is metered between each successive occurring positive transition in waveform 36A with the total number of full cycles, i.e., positive transition to positive transition, of the signal being tallied. The end measurement from the last-occurring positive transition as at 29 until detection of EOR 22 is also metered. The beginning time from EOR 21 to the first transition and the ending time from the last transition 29 to BOR 22 are added together. Next, the average elapsed time between successive ones of positive transitions, i.e., full tach cycles, is then calculated. This indicates the amount of time for one tach cycle or relative velocity. The end metered times previously mentioned are then divided by the total cycle time (average velocity) to give the proportionate number of tachometer cycles represented by the two end measurements. This proportionate number of cycles is then added to the total number of full cycles measured with IBG 25. Since each cycle is representative of a predetermined distance on tape 100, that unit distance is then multiplied by the total number of cycles for precisely indicating IBG 25 length. When this measurement is made at constant design velocity 26, there is relatively no tape slip between tape 100 and capstan 103 thereby providing a relatively precise length measurement. The frequency of the time clock is substantially higher than the frequency of tachometer signal 36A, at least 10:1. In one constructed embodiment, the ratio was about 25:1.

Measuring IBG length while stopping in the middle of the IBG as indicated by velocity profiles 27 and 28, the same measurement technique uses the same method.

IBGM is represented by the following equation:

$$IBGL = dk \{ K((I_0 + T_{K+1})/TX) + K \}$$

WHEREIN:

IBGL = length of IBG.

dK = distance on tape 100 per tach cycle.

K = number of full tach cycles in IBG 25.

$T_0$ = elapsed time from EOR 21 to the first positive transition.

$T_{K+1}$ = elapsed time from last positive transition in IBG 25 to BOR 22.

Tx = average elapsed time of a full tach cycle in the instant IBGM.

GENERAL DESCRIPTION OF TAPE SUBSYSTEM (TSS) (FIG. 2)

Figure 3:
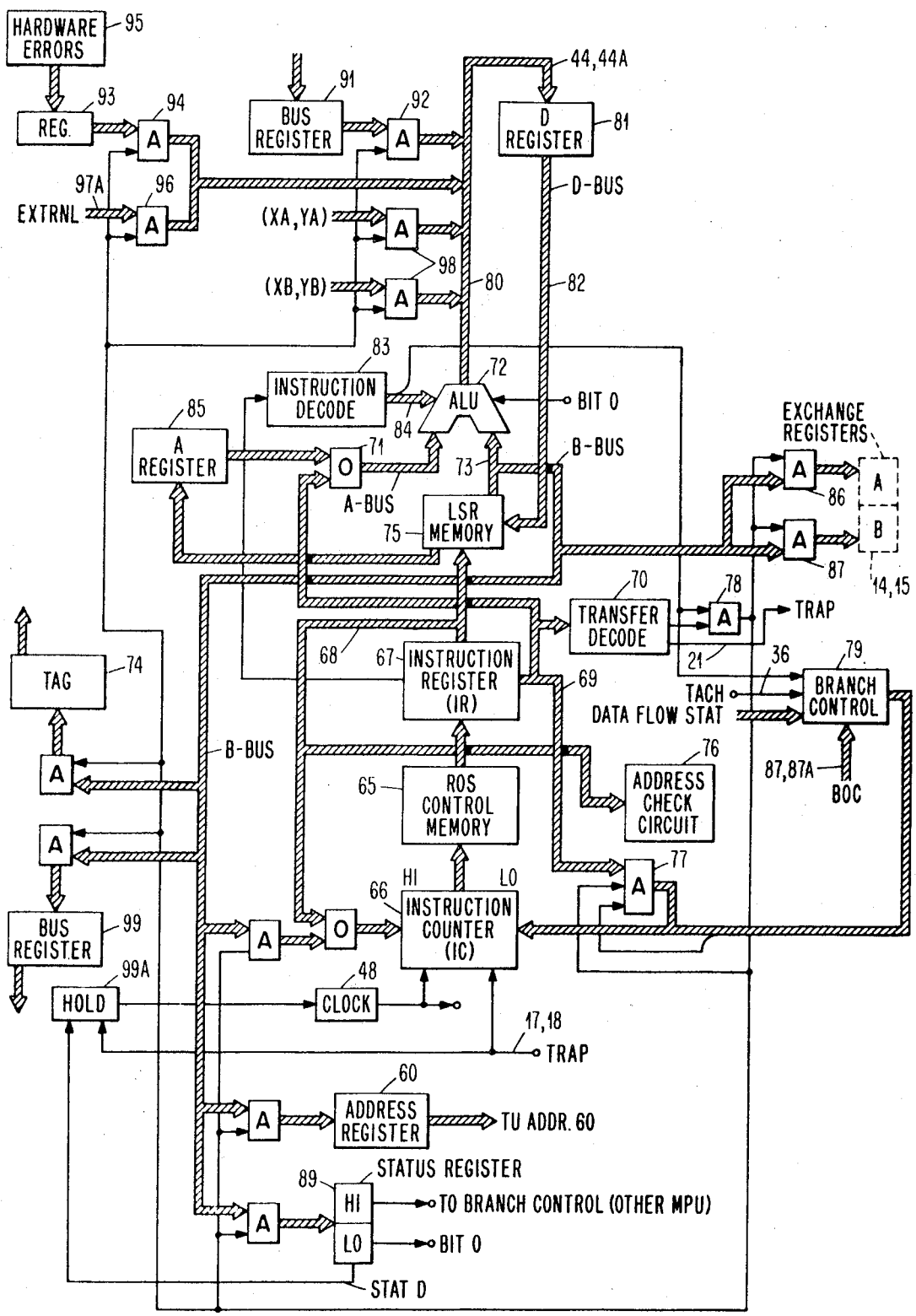
FIG. 3 is a simplified logic block diagram of a microprocessor usable within the FIG. 2 illustrated system.

The present invention is more fully described using microprogrammable I/O controller 11 in a tape subsystem (TSS). TSS is connected to CPU via INTFX, the type of channel described in the Moyer et al. U.S. Pat. No. 3,303,476. The description assumes a channel-I/O controller interface usable with a channel of the type described in that patent. FIGS. 1 and 3 of that patent describe all tag signals used herein except sappressible REQUEST IN which is defined with respect to MPUX (channel MPU) microprograms. It also assumes that the interface between the controller and the I/O devices follows a similar bus-out, bus-in, tag line arrangement. In addition to the functions described in the Moyer et al patent supra, tachometer input line 36 is provided to I/O controller 11, as later described.

INTFX communicates with CPU via cable 10. The term CPU is hereafter used to include the channel portions (INTFX) of data processors. I/O controller 11 provides control for exchanging information-bearing signals between INTFX and interface Y (INTFY). INTFY is connected to one or more magnetic media devices via cable 12. Such I/O devices, for purposes of illustration only, are magnetic tape units (MTU's) capable of recording and reproducing information-bearing signals, inter alia, in phase-encoding (PE) and NRZI schemes.

I/O controller 11 has three main sections. MPUX is a microprogrammable unit providing synchronization and control functions between the I/O controller and INTFX. MPUY, a second microprogrammable unit, performs similar functions with INTFY. In a magnetic tape subsystem, MPUY provides motion control and other operational related functions uniquely associated with the described I/O device. The third section, data flow circuits 13, actually process information-bearing signals between interfaces X and Y. Data flow circuits 13 may consist entirely of a hardware set of sequences and circuits for performing information-bearing signal exchange operations. In an I/O controller associated with a magnetic-tape recording system, such data flow circuits include writing circuits for both PE and NRZI, readback circuits for both encoding schemes, deskewing operations, certain diagnostic functions, and some logging operations associated with operating a magnetic tape subsystem.

Since MPUX and MPUY are independently operable, each having its own programs of micro-instructions, program synchronization and coordination are required. To this end, exchange register networks are provided; for example, MPUX has exchange registers 14 while MPUY has exchange registers 15. These registers receive output signals from the respective MPU's. The signals temporarily stored in these registers are supplied directly to data flow circuits 13 for effecting and supervising data flow and signal processing operations. This arrangement makes the data flow circuits 13 subservient to both MPUX and MPUY. Additionally, such signals are simultaneously provided to the other MPU--that is, register 15 supplies MPUY output signals to MPUX and register 14 supplies the MPUX output signals to MPUY. The respective MPU's under microprogram control selectively receive such signals for program coordination.

INTFX is a controlling interface. It not only exchanges control signals with MPUX, but also has trap control line 17 (FIGS. 2 and 3). When this line is actuated, MPUX aborts all present operations and branches to a fixed address for analyzing signals on cable 16. These signals force MPUX to perform INTFX selected functions. In a similar manner, MPUX has trap control line 18 extending to MPUY. MPUY responds to an actuating signal on line 18 from MPUX in the same manner that MPUX responds to a trap signal on line 17. MPUY, in addition to exchanging control signals with devices via INTFY, also has trap line 21 for controlling an I/O device in a similar manner. All information-bearing signals are exchanged between interfaces X and Y through data flow circuits 13 via full-duplex cables 23 and 24.

Data flow circuits 13 have channel bus in (CBI) lines 30 and channel bus out (CBO) lines 31. Each set of lines has a capability of transferring one byte of data plus parity. Similarly, tape unit bus in (TUBI) lines 32 transfer signals to data flow circuits 13 and MPUY over INTFY. Tape unit bus out (TUBO) lines 33 carry information-bearing signals for recording in MTU's plus commands from MPUY and MTU addresses from MPUX. Status signals are supplied both to MPUX and MPUY over status cable 34 and 35. Velocity or tachometer signals supplied by the selected and actuated MTU are received over line 36 by MPUX, MPUY, and data flow circuits 13.

MPUX has output bus 40 (also termed B bus) supplying signals to its exchange registers 14. These include branch control register 41, register XA, and register XB. Output bus 40 is also connected to the channel exchanging registers 42 (CTI and CBI). CBI is channel bus in, while CTI is channel tag in. CTI transfers the tag signals from I/O controller 11 to CPU as described in the Moyer et al. patent and other control signals for interface operations.

Additionally, channel bus out (CBO) gate 43 receives bytes of data from INTFX for data flow circuits 13 and for MPUX. Gates XA and XB similarly gate exchange signals from the MPUY exchange registers 15. Gate XA receives the control signals from register YA while gate XB receives exchange signals from register YB. CBI register is shared by MPUX and data flow circuits 13. The CBI lines over INTFX are multiplexed in accordance with the Moyer et al. patent. CTI supplies tags indicating what the bus in signals mean.

INTFY operates in an identical manner. Signals in TUBO (tape unit bus out) register output lines 33 are interpreted by the MTU's in accordance with the signals in TUTAG (tape unit tag) register.

External signals are supplied to MPUX and MPUY via external registers 50 and 51, respectively. Such external signals may be from another I/O controller, from a maintenance panel, communication network, and the like. Also, hardware detected errors are lodged in register 52 for sampling by MPUX.

I/O controller 11 has an efficient initial selection process. MPUX responds to INTFX request for service of an MTU to provide the MTU address over output line 40 into TU address register 60. INTFY transfers the TU address to all MTU's. The appropriately addressed MTU responds to MPUY that the selection is permissible or not permissible. If permissible, a connection is made; MPUY notifies MPUX via register YA. MPUX then completes the initial selection by responding to INTFX via CTI. Data processing operations then can ensue. A detailed description of this initial selection procedure is included for clearly showing the relationships between MPUX, MPUY, data flow circuits 13, and interfaces X and Y.

MICROPROGRAMMABLE UNITS (MPU's)

The MPU's contain microprograms which determine the logic of operation of I/O controller 11. MPUX contains a set of microprograms in its control memory designed to provide responsiveness and data transfers via INTFX. In a similar manner, MPUY contains a set of microprograms for operation via INTFY with the various MTU's. Registers 14 and 15 contain signals from the respective microprograms which serve as inputs to the respective programs for coordinating and synchronizing execution of various functions being performed. A better understanding of how the microprograms operate the hardware is attained by first understanding the logic construction of the MPU's which, in the illustrative embodiment, are constructed in an identical manner.

Referring more particularly to FIG. 3, the microprograms are contained in read-only-store (ROS) control memory 65. While a writable store could be used, for cost-reduction purposes, it is desired to use a ROS memory. The construction and accessing of such memories are well known. The ROS output signal word, which is the instruction word, is located by the contents of instruction counter (IC) 66. IC 66 may be incremented or decremented for each cycle of operation of MPU. By inserting a new set of numbers in IC 66, an instruction branch operation is effected. The instruction word from ROS 65 is supplied to instruction register (IR) 67 which staticizes the signals for about one cycle of MPU operation. The staticized signals are supplied over cables 68 and 69 to various units in MPU. Cable 68 carries signals representative of control portions of the instruction word, such as the operation code and the like. Signals in cable 68 are supplied to IC 66 for effecting branching and instruction address modifications. Cable 69, on the other hand, carries signals representative of data addresses. These are supplied to transfer decode circuits 70 which respond to the signals for controlling various transfer gates within MPU. The other portions of the signals are supplied through OR circuit 71 to ALU 72. In ALU 72, such signals may be merged or arithmetically combined with signals received over B bus 73 for indexing or other data processing operations. MPU has local store register memory (LSR) 75 accessible in accordance with the address signals carried over cable 68. Address check circuit 76 verifies parity in the address. The address signals may also be used in branch operations. AND circuits 77 are responsive to transfer decode signals supplied from circuits 70 through AND circuits 78 to transfer the address signals in an instruction word to IC 66. Such transfer may be under direct control of the operation portion of the instruction word as determined by transfer decode circuits 70 or may be a branch on condition (BOC) as determined by branch control circuits 79 which selectively open AND circuits 77 in accordance with the conditions supplied thereto, as will become apparent.

The data flow and arithmetic processing properties of the MPU center around ALU 72. ALU 72 has two inputs—the A bus from OR circuit 71 and B bus 73. ALU 72 supplies output signals over cable 80 to D register 81. D register 81 supplies staticized signals over D bus 82 to LSR 75. Instruction decode circuits 83 receive operation codes from IR 67 and supply decoded control signals over cable 84 to ALU 72 and to AND circuit 78 for selectively transferring signals within MPU.

ALU 72 has a limited repertoire of operations. Instruction decode 83 decodes four bits from the instruction word to provide 16 possible operations. These operations are set forth in the Instruction Word List below:

Instruction Word List

| Op Code | Mnemonic | Function |
| --- | --- | --- |
| 0 | STO | Store Constant in LSR, A set to 0 |
| 1 | STOH | Store Constant in LSR, Indexed Addressing |
| 2 | BCL | Match with Field 1, Branch to Addr in Field 2 |
| 3 | BCH | Match with Field 1, Branch to Addr in Field 2 |
| 4 | XFR | Contents of one selected LSR location is transferred to selected register or selected input is gated to one selected LSR location |
| 5 | XFRH | See XFR above plus indexed addressing |
| 6 | BU | Branch to 12-bit ROS address in instruction word |
| 7 | 00 | Not used—illegal code |
| 8 | ORI | A OR'd with B, result stored in LSR 75 |
| 9 | ORM | A OR'd with B, result not stored |
| A | ADD | A plus B, sum stored in LSR75 |
| B | ADDM | A plus B, sum not stored |
| C | AND | A ANDed with B, result to LSR 75 |
| D | ANDM | A ANDed with B, result not stored |
| E | XO | A Exclusive OR B, result to LSR 75 |
| F | XOM | A Exclusive OR B, result not stored |

In the above list, the letter "A" means A register 85, "B" is the B bus, and the mnemonics are for programming purposes. The term "selected input" indicates one of the hardware input gates (92, 94, 96, 98) to the ALU output bus 80. The term "selected register" indicates one of the "hardware" registers in MPU. These include the interconnect registers 14 and 15 (FIG. 2), tag register 74, bus register 99, address register 60, and IC 66. Note that transfers from LSR 75 to these selected registers are via B bus 73. In FIG. 2, the B bus for MPUX corresponds to cable 40, while the MPUY B bus is cable 40A. Registers 14 receive signals via AND circuits 86 and 87. In MPUY, AND circuits 86 and 87 supply signals to exchange registers 15. Branch control 79 in FIG. 3 is the internal branch control. Branch controls 41 and 41A of FIG. 2 supply their signals respectively over cables 88 and 87A to the respective MPU's. These branch controls are separate circuits. Tag register 74 in FIG. 3 for MPUX corresponds to CTI register in the channel exchange registers 42. For MPUY, it corresponds to TUTAG register connected to INTFY. In a similar manner, bus register 87 for MPUX is register CBI in channel exchanging registers 42, while in MPUY it is register TUBO (tape unit bus out). Address register 60 of FIG. 3 corresponds to TU address register 60 of FIG. 2. MPUY address register 60 is not used.

Status register 89 has several output connections from the respective MPU's. It is divided into a high- and low-order portion. The high-order portion has STAT (status) bits 0–3, while the low-order portion has STAT bit 0 plus STAT bits 4–7 (referred to as STAT A through STAT D, respectively). The low-order portion is supplied to the branch control 79 of the other MPU's. The bits 0 and 4–7 are supplied to the data flow. Bit 7 additionally is supplied directly to the ALU 72 of MPUY as indicated by lines 90 in FIG. 2. Interpretation of the STAT bits is microprogram determined and varies in accordance with the desires of the microprogrammer.

The signal-receiving portions of each MPU are in four categories. First, bus register 91 is designed to receive tags and data bytes for MPUX—this corresponds to CBO register 43 of FIG. 2. MPUY bus register 91 is TUBI (tape unit bus in) register. AND circuit 92 is responsive to the transfer decode signals from circuits 70 to selectively gate bus register 91 to D register 81. From thence, the data bytes are supplied to LSR 75. Secondly, D register 81 also receives inputs from hardware error register 93 via AND circuit 94. Hardware error signals (parity errors, etc.) are generated in circuit 95 in accordance with known techniques. Thirdly, AND circuit 96 receives external data signals over cable 97A for supplying same to D register 81 under microprogram control. Fourthly, interchange registers 14 and 15 respectively supply signals to pairs of AND circuits 98 which selectively gate the interchange signals to D register 81 under microprogram control. The receiving microprogram controls the reception of interchange signals from the other MPU.

Generally, the outgoing signals from each MPU are supplied via B bus 73, also a main input bus to ALU 72. The signal-receiving bus is the D bus, which is the input bus for LSR 75 and the output bus for ALU 72.

Since ALU 72 has a limited repertoire of operations, many of the operations performed are simple transfer operations without arithmetic functions being performed. For example, for OP code 4, which is a transfer instruction, the contents of the addressed LSR are transferred to a selected register. This selected register may be A register 85 in addition to the output registers. To add two numbers together in ALU 72, a transfer is first made to A register 85. The next addressed LSR is supplied to the B bus and added to the A register contents with the result being stored in D register 81. At the completion of the ADD cycle, the contents or result of D register 81 are stored in LSR 75. If it is desired to output the results of the arithmetic operation, then another cycle is used to transfer the results from LSR 75 over B bus 73 to a selected output register such as one of the interchange registers or bus register 87.

In FIG. 3, the input to D register 81 is either cable 44 or 44A of FIG. 2. Hardware error circuit 95 and error register 93 of FIG. 3 correspond both to the hardware error circuits 52 and 52A of FIG. 2. External cables 97A receive signals from the external registers 50 and 51 respectively for the two MPU's.

AND circuits 98 of FIG. 3 correspond to the gates XA, XB, YA, and YB of FIG. 2.

Each MPU is trapped to a predetermined routine by a signal on trap line 17 or 18, respectively. The trap signal forces IC 66 to all zeroes. At address 000, the instruction word initiates X-trap routine or Y-trap routine, later more fully referred to. For reliability purposes, it is desirable to force MPUY to inactivity. This means that clock oscillator 98 is gated to an inactive state. During normal operations, clock 98 supplies timing pulses to advance IC 66 and coordinate operations of the various MPU's as is well known. Whenever MPUY has finished its operations, it sets stat D in register 89. stat D indicated MPUY has finished its operations as requested by MPUX. The stat D signal sets hold latch 99A indicating that MPUY is inactive. Hold latch 99A gates clock 98 to the inactive condition. When MPUX traps MPUY, not only is IC 66 preset to all zeroes, but hold latch 99A is reset. Clock 98 is then enabled for operating MPUY.

GENERAL DESCRIPTION OF MTU

Each of the plurality of MTU's is identically constructed. A typical MTU is shown in simplified diagrammatic form in FIG. 4.

Magnetic tape 100 is selectively transported past transducer or head 104 between a pair of tape spools 101 and 102 by capstan 103. Tape 100 forms a pair of bights in low inertia vacuum bins (not shown) for improving the acceleration and deceleration characteristics of the tape past head 104. In many magnetic tape units, such characteristics are very important for short access times and ensuring that magnetic tape 100 continually bears against head 104 for effecting desired transducing operations. One purpose of the present invention is to analyze the performance of each MTU in performing the transport of tape 100 past transducer 104. This is accomplished by analyzing the tachometer signals on line 36 supplied by the motor drive system 105 in combination with the signal read through head 104 and then processed by read/record circuits 106 and transferred over TUBI 32 and INTFY to I/O controller 11.

The tape driving system operating capstan 103 includes motor 107 actuated by motor control 108. A velocity set point is usually supplied to motor control 108. Such set point may be an oscillator or an analog voltage. Motor 107 has tachometer 109 supplying signals to shaper 110 which then supplies a square wave over line 111 indicating performance of motor 107. Tachometer 109 is preferably of the digital type—that is, a disk or ring with a large plurality of light/dark areas for indicating rotational translation. A reflective tachometer may be used having alternate reflective and nonreflective areas. In any event, shaper 110 supplies a tachometer signal, preferably a square wave, over line 111 which is indicative of motor 107 performance as controlled by motor control 108.

Assuming no tape slip between tape 100 and capstan 103, tachometer signals on line 111 indicate translation of tape 100 past head 104. For selectively controlling movement of tape 100, control logic 112 is responsive to signals supplied by I/O controller 11 over TUBO and TUTO to supply a "go" signal over line 113 to motor control 108. When a "go" signal is supplied over line 113, motor control actuates motor 107 to move tape 100. As soon as the "go" signal is removed by control logic 112, control 108 actuates motor 107 to stop. The generation of the "go" signal on line 113, as well as direction (forward/backward) signals over line 113A, in response to signals supplied by I/O controller 11, are well known and are not further described for that reason.

Control logic 112 also actuates and controls read/record circuits 106 and may be in accordance with known techniques; such control is not further described for that reason. Control logic 112 sequences the outputs of sensors 114 to TUBI in response to command signals received from I/O controller 11 to supply what are usually termed "sense bytes" to I/O controller 11 which indicate the status of the respective MTU. Such sensors may indicate the location of tape 100, whether or not a pair of tape spools 101 and 102 are mounted in the MTU for proper operation, and the like. Read/record circuits 106 may include gating and other logic circuits in accordance with known techniques. In controlling the signals read back from transducer 104, AND circuits 115 selectively gate the partially detected signals in read/record circuits 106 through OR circuit 116 to TUBI 32 for transfer to I/O controller 11. I/O controller 11 continues the processing of such signals in data flow circuits 13. The control of AND circuits 115 is in accordance with command signals received over TUBO and TUTO from I/O controller 11.

While recording signals on tape 100, the data bytes to be recorded are supplied over TUBO 33 simultaneously with the MOVE signal on TUTO, line 117, which commands logic 112 to supply the "go" signal over line 113. The data signals to be recorded are transferred directly to read/record circuits 106 for amplification and supply to transducer 104. I/O controller 11 coordinates the MOVE command on line 117 together with the transfer of data bytes to be recorded over TUBO. The other two control lines in TUTO command and cause control logic 112 to receive the signals on TUBO 33 and decode same for causing functions to be performed in MTU in accordance with the signal permutations on TUBO. Such control or command signals may cause MTU to rewind the tape, transfer sense bytes from sensors 114 to TUBI, set up operations for transferring the signals from TUBO to transducer 104 or vice versa, etc.

Transfer of tachometer signals from shaper 110 and line 111 to tach line 36 may be under control of I/O controller 11. That is, any of the tag lines in TUTO being active are supplied through OR circuit 118 enabling AND circuit 119 to pass the tachometer signals to tach line 36. Any time the addressed MTU is receiving a tag line signal from an I/O controller, the I/O controller is instructing the MTU to transfer tachometer signals to such I/O controller. Of course, the I/O controller must be programmed and set up to receive and interpret such supplied tachometer signals. In the alternative, line 111 may be connected directly to tach line 36 such that any time motor 107 is activated, tachometer signals are supplied over line 36. In that arrangement, which is preferred in many applications, the I/O controller is programmed to receive such tachometer signals on a selective basis; i.e., program operated gates within controller 11 either inhibit or pass tachometer signals to appropriate evaluation circuits, as will become apparent.

In the former arrangement, AND circuit 119 enables tach line 36 to be used for supplying tachometer signals to I/O controller 11 during MTU operations. When MTU is not busy, a NOT BUSY signal is generated by control logic 112 and supplied over not busy line 150 through OR circuit 151 to tach line 36. In the latter instance, I/O controller 11 sharing a particular MTU with another I/O controller can sense line 36. If a predetermined static voltage appears thereon, the interrogating I/O controller will know the MTU is available and then can select same for data processing, diagnostic, or other operations. However, if tachometer signals are being supplied over line 36 by the addressed MTU, then the interrogating I/O controller (not shown) knows the MTU is being used by another I/O controller; and it will then branch to other operations. This latter arrangement is useful in complex data processing systems wherein a plurality of I/O controllers is connected to a larger plurality of MTU's and also to a plurality of CPU's.

MICROPROGRAMMING GENERALLY

Figure 5:
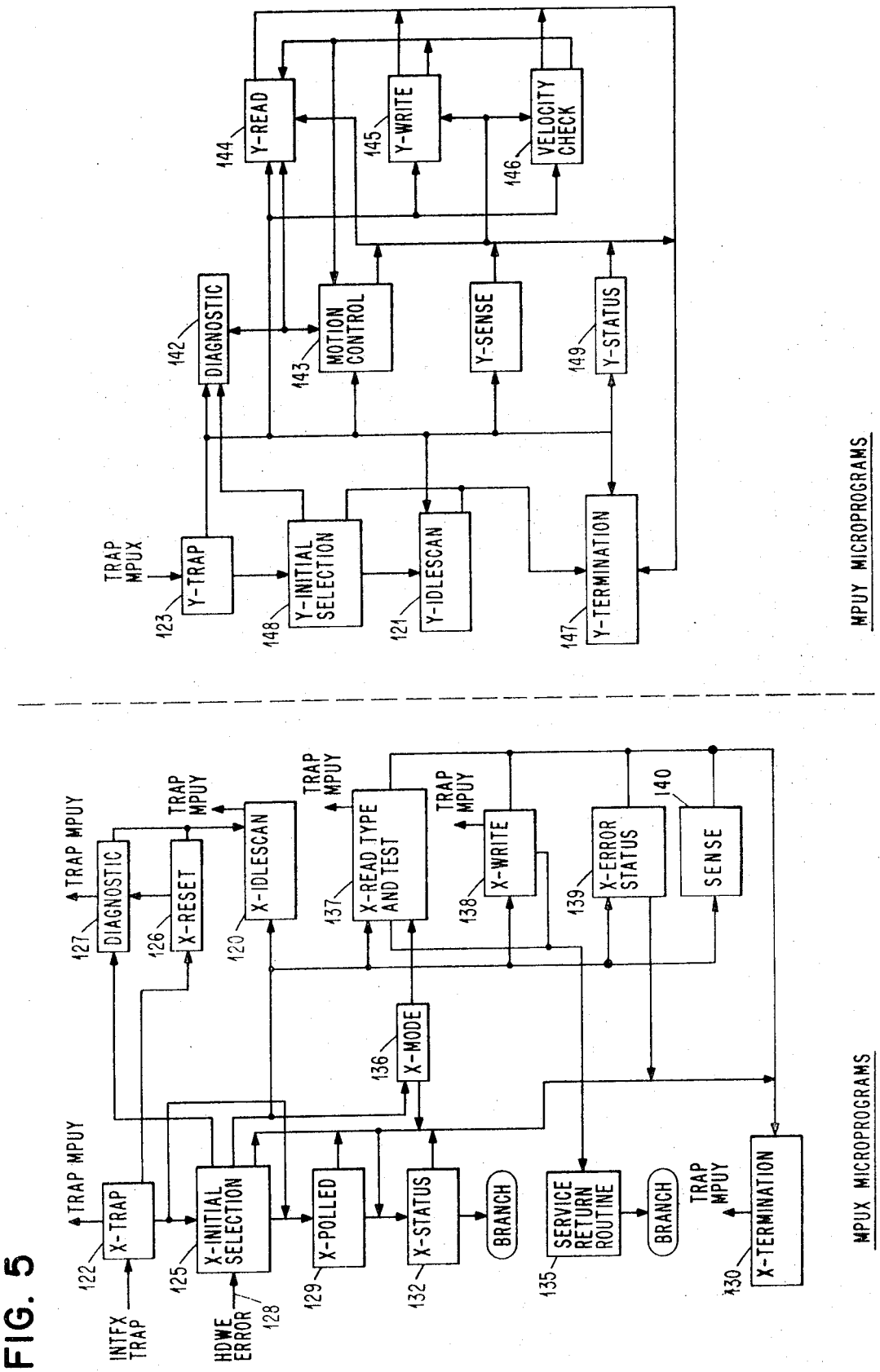
FIG. 5 is a simplified showing of a microprogram layout for the controller illustrated in FIG. 2 which utilizes two microprocessors illustrated in FIG. 3.

FIG. 5 shows general relationships between the micro-routines of MPUX and MPUY. This showing is greatly simplified to give a general impression of how the micro-routines cooperate to perform I/O controller functions. Many of the functions performed by these micro-routines have been performed before in other I/O controllers, usually by hardware sequences. Some micro-routines of lesser importance to the present invention have been omitted for clarity. The described routines were selected to illustrate the operating relationships of MPUX, MPUY, data flow circuits 13, MTU's, and CPU in evaluating MTU performance by combining tachometer and readback signals from such MTU.

X idlescan 120 and Y idlescan 121 monitor pending status, interrupt status, and provide intercommunication between the two MPU's for ascertaining the availability of devices connected to INTFY. X idlescan 120 includes trapping MPUY via Y idlescan 121 for polling INTFY to determine availability of an MTU addressed by INTFX. Included in X idlescan is a wait routine which idles MPUX until trapped by INTFX. INTFX traps MPUX to ROS 65 address 000. At MPUX ROS address 000, X-trap 122 begins. During the execution of X-trap routine 122, MPUY is trapped to ROS address 000 to later execute Y-trap routine 123. In X-trap 122, CTO is sensed for initial selection. If the initial selection tag is active, X-trap routine branches the microprogram to X-initial selection 125. If there is no initial selection, then either X-reset 126 or an ALU diagnostic within diagnostic 127 is performed. Upon completion of these functions, X idlescan 120 may be re-entered to complete MTU scanning operations. Initial selection 125 is responsive to certain hardware errors received at 128 (sensed as described with respect to FIG. 3) to stop I/O controller 11 for indicating detected hardware errors. A primary function of initial selection 125 is interrupt processing.

During an initial selection, X-polled 129 is entered to further identify the INTFX request. Also, certain branch conditions are set up in LSR for use later by X-termination 130. MTU address verification may be performed. Upon completion of the branch setups. the X-polled 129 initiates X-status 132. X-status 132 activates CTI to send tag signals to INTFX indicating controller status in response to the previously received INTFX request. Based upon the branching set up in X-polled 129, the microprogram execution may follow several routes. These routes generally lead to X-termination 130 which terminates the MPUX operation. MPUX then scans for further interrupts. With all scanning completed, MPUX waits for further instructions from INTFX.

Another important routine is service return (SERVRTN) 135 used in conjunction with INTFX for timing and control purposes during data transfers. The operation of the above-referred-to data channel operation in Moyer et al is implemented by service return 135. Another possible routine entered from initial selection 125 is X-mode 136, which determines the mode of operation in the controller in response to INTFX CMDO (Command Out) signals. X-read type and test 137 is entered in the event the initial selection results in a read operation. X-read type and test 137 traps MPUY to predetermined addresses, as later explained, for initializing a read operation in MPUY. In a similar manner, X-write 138 is entered and also traps MPUY to another subroutine for initializing a write operation. Error status 139 transfers error information through INTFX to CPU. This routine is closely associated with initializing I/O controller 11 for read or write. Sense 140 is entered in response to a sense command. Sensing transfers sense bytes to CPU for analysis. X-termination 130 also traps MPUY in connection with the selecting activated MTU's and for performing other functions in connection with terminating an operation previously initiated through INTFX as will be described. MPUY microroutines respond to MPUX micro-routines for controlling various MTU's via INTFY. These micro-routines also transfer information control signals from INTFY to MPUX for retransmittal to INTFX. Upon being trapped by MPUX, Y-trap 123 obtains an MPUY ROS address from XB register and then branches to that address. Such ROS addresses are the first instruction address of several MPUY microprograms. For example, one address initiates diagnostic 142. Diagnostic 142 may initiate one of several microprograms of FIG. 5 for effecting operations in CU 11 or an MTU for diagnostic purposes. Such program connections are not shown.

On the other hand, Y-trap routine 123 may branch to Y-initial selection 148 to initialize MPUY for activity set forth in additional control signals from MPUX in registers 14. This may include an initiation of status 149, termination 147, or Y-idlescan 121. The MTU operating routines 143–146 may also be initiated from initial selection 148.

MICROPROGRAMMED CONTROLLED PERFORMANCE MEASUREMENTS

Figure 6X:
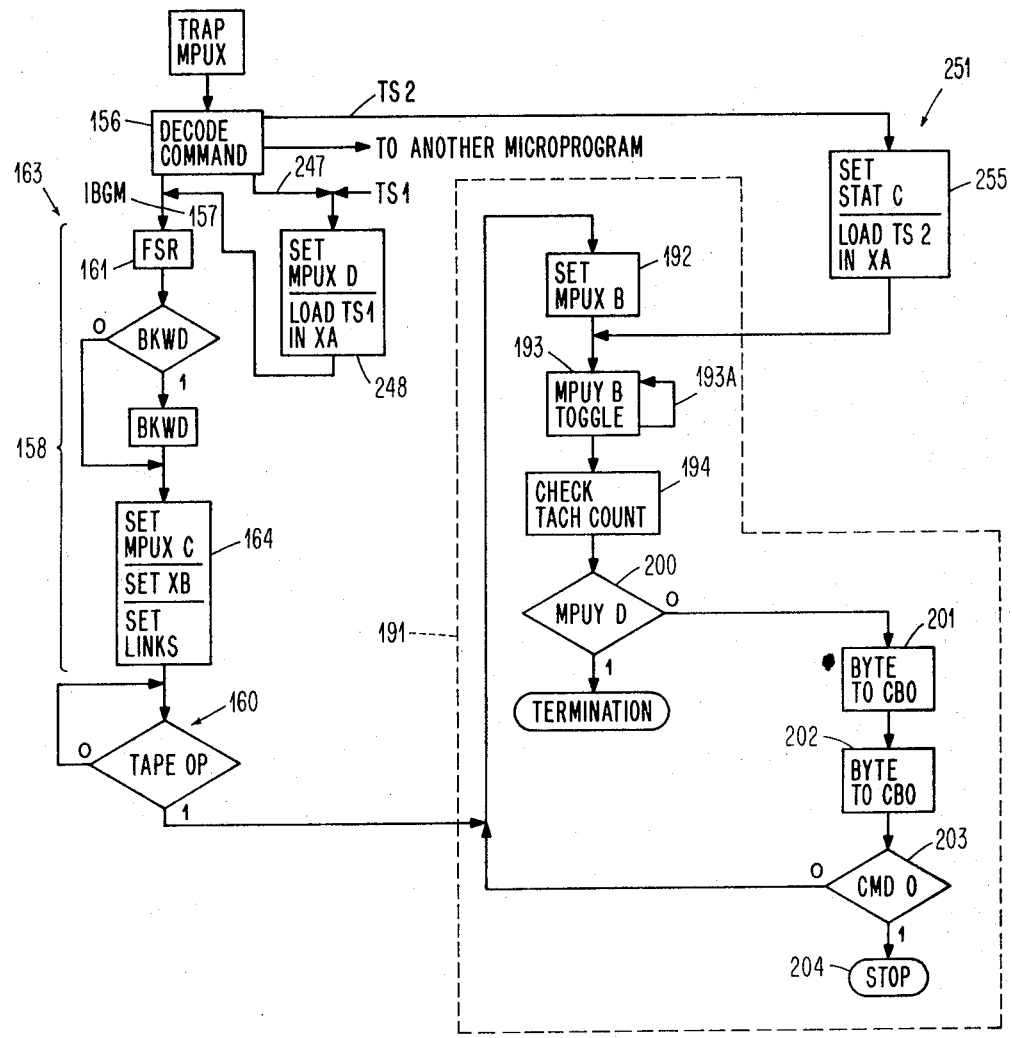
FIGS. 6X and 6Y are simplified flow charts showing microprograms usable with the two microprocessors in the FIG. 2 illustrated system for effecting the method of the present invention and constitute a portion of the present invention with respect to apparatus.
Figure 8:
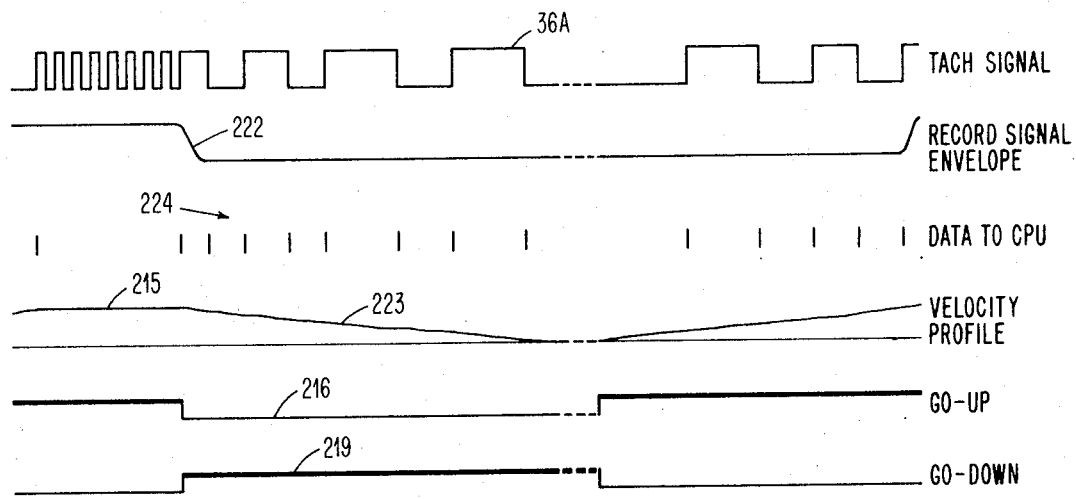
FIG. 8 is a simplified timing diagram of a tape slip measurement using the computer program set forth in FIG. 7.

Microprogrammed operation of CU 11 for measuring performance of an MTU is controlled by diagnostic routine 127 (FIG. 5). CPU sends a channel command including a channel control word (CCW) to CU 11 which is decoded and effects the trap to routine 122. Routine 122 branches to diagnostic routine 127 illustrated in FIG. 6X. It is understood that there may be more diagnostics resident in CU 11 than is shown in FIG. 6X. For the present description, there are two possible diagnostics—IBGM (interblock gap measure) and tape slip (TS-1 and TS-2).

CU 11, after acknowledging receipt of the command from CPU, sets up MPUX LSR 75 in link registers 1, 2, and 3, respectively, for SVCO, CMDO, and halt I/O (HIO) response ROS address pointers. These pointers direct the microprograms in MPUX to the appropriate microprograms in ROS as generally discussed in the above-referenced co-pending application. The microprogram (FIG. 6X) decodes the channel command at 156 by first checking whether or not it is a diagnose command from CPU. If not, other microprograms not further described are entered. If it is a diagnose command, i.e., diagnostic, then the microprogram in step 156 first determines the type of diagnostic. CU 11 then executes one of the two following described microprograms for effecting the CPU commanded operation.

The beginning of record (BOR) and end of record (EOR) format signals derived from the readback signals in accordance with known signal processing techniques in CU 11 are format check points between data blocks and IBG's. As such, in accordance with the invention, these BOR and EOR format signals are used as performance check points.

INTERBLOCK OR INTERRECORD GAP MEASURE (IBGM)

For an IBGM, the microprogram follows line 157 to execute subroutine 158 and then enters wait loop 160 indicating that an IBG is ready to be measured. The functions performed in routine 158 in a forward IBGM (media moving in forward direction) is to forward space one record (FSR) 161. This action initiates tape movement past transducer 104 for measuring an IBG downstream from the record being spaced over. Usually, a forward space record (FSR) moves the tape from an initial position in one IBG forward to the next downstream IBG. In the IBGM, this function is used to initiate IBGM with the FSR being aborted before a stop is initiated. The next downstream IBG is measured, and then the following downstream record is passed over with the tape resting in the second following downstream IBG. The IBGM data is transferred to CPU by micro-routine 191 in response to tachometer signal 36A.

Referring momentarily to FIG. 7, the tape is initially positioned such that the transducer is between load point (LP) and record A. The FSR command causes the tape to move under the transducer such that record block A could be read. Normally in an FSR, the tape is stopped such that the transducer will reside in IBG 185. However, in an IBGM, end of record (EOR) is detected and the tape continues to move such that the distance to BOR of the next record block B (IBG 185) can be measured. After IBG 185 has been measured, the tape is transported until the transducer is in transducing relationship with the next downstream or forward IBG 185A. This action can be repeated for a plurality of IBG's without stopping the tape.

Figure 6Y:
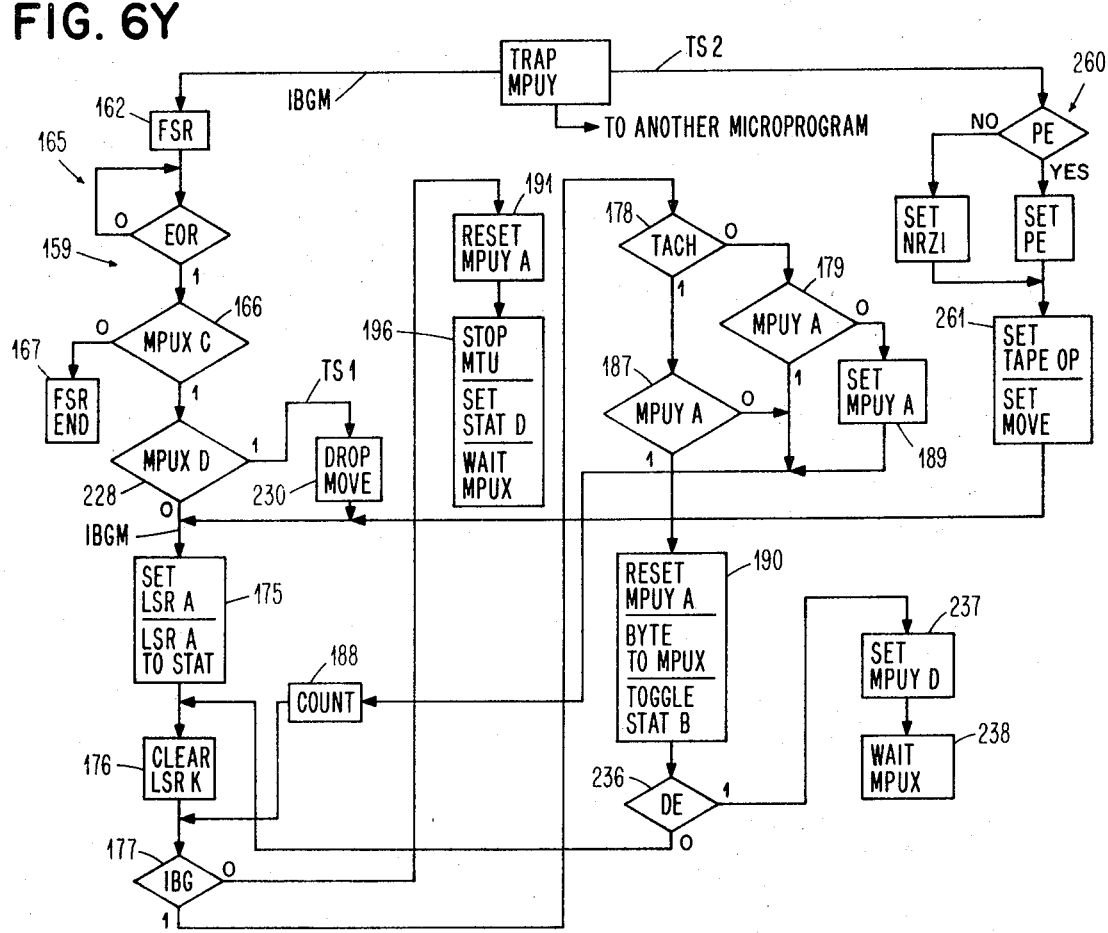

Returning now to FIG. 6X, microprogram 163 in MPUX first issues an FSR-IBGM command to MPUY at step 161. This is accomplished by inserting the MPUY ROS address for FSR into register XB and setting STAT C (STAT C = diagnostic; therefore, an IBGM when accompanying an FSR in XB). MPUY responds to STAT C to fetch the ROS address from register XB and then executes its FSR routine 162 (FIG. 6Y). FSR routine 162 sends command signals to the addressed MTU causing it to do an FSR, then an IBGM. While MPUY is initiating the FSR in the MTU, MPUX checks whether or not a backward operation is to be performed. In program 163, a branch operation is based upon the backward bit in LSR 75 which would have been received from CPU. If a backward space is to be performed, then the backward bit is set in XB; and MPUY is forced to fetch the backward bit and enter a BSR (backward space record). MTU then moves the tape backward rather than forward. However, for purposes of discussion, we are assuming that all tape motions for IBGM are in the forward direction.

After checking backward, MPUX then performs step 164 setting MPUX STAT C telling MPUY that a diagnostic operation is being performed; XB is set to FSR-IBGM; and program links are set in MPUX LSR 75 in a known programming manner. STAT C is interpreted by MPUY differently in different microprograms in accordance with known design and programming techniques.

After fetching the FSR command from XB, MPUY idles in microloop 165 (FIG. 6Y) waiting for EOR (end of record). This wait time is the time tape 180 is moving under the transducer, such as in the blank space between load point and first record A plus record A. An EOR signal is generated in data flow circuits 13 (FIG. 2) at the downstream end of record A. Generation of such a signal and its meaning is well understood from different tape subsystems. The EOR signal causes MPUY micronroutine to proceed to branch operation 166 (FIG. 6Y). Here, MPUY checks MPUX STAT C. If the STAT C has not been set, i.e., a normal FSR was being performed, then MPUY branches to normal FSR ending routine 167. That is not further described.

For diagnostics, MPUX STAT C has been set; and MPUY proceeds at step 175 to load its STAT A in an "image" register in its LSR 75. MPUY then proceeds to measure the IBG sending distance information to MPUX for retransmittal to CPU each time the tach signal 36A/36B on line 36 (FIG. 1) from MTU undergoes a positive-going transition. In this regard, MPUY STAT A in LSR 75 tracks the polarity of the tachometer signal. Each time the tachometer signal goes positive, STAT A is a binary 1; and when the tachometer signal goes negative, STAT A is 0. As will become apparent, STAT B in both MPUX and MPUY is used to transfer tach signal information from MPUY to MPUX.

Tachometer signal measurement and its relationship to IBGM is better understood by referring to FIG. 1. IBG 25 extends between EOR 21 and BOR 22 of two adjacent record signal blocks in record signal envelope 20. Tachometer signal 36A is monitored to indicate the IBG distance. EOR 21 happens to occur in the middle of a positive portion of tachometer signal 36A. Data is transferred from MPUY to MPUX and thence to CPU at the first and every positive-going transition and at BOR 22 as indicated by the marks 224. Such data will be transferred several times. Elapsed time is repeatedly measured as first explained.

The measurement and data transfer technique used by MPUY microprograms is shown in FIG. 6Y. At 175, after setting STAT A in LSR, the STAT A signal is transferred to the STAT register 89 (FIG. 3) for internal use by MPUY. At the same time at 176, the counter in LSR is cleared to all zeroes in preparation for IBGM to the first-occurring positive transition. In decision step 177, the IBG is checked to see if it is still present. The IBG indication is a latch (not shown) in data circuits 13 (FIG. 2) which is set by EOR signal and reset by the BOR signal. If IBG is a one, we are still measuring IBG 25 (FIG. 1). Next, in step 178, the polarity of the tachometer signal 36A is detected. Initially, signal 36A is positive; therefore, a binary 1 is detected in step 178. Next, MPUY STAT A is checked in step 187. Since it was set in step 175, the STAT A latch in register 89 is reset; and a byte (all 0's) is transferred to MPUX. The all 0's byte indicates EOR 21 has been detected and does not enter into the IBG distance calculation. This transfer is effected by loading the YB register and setting MPUY STAT B.

Next, in step 176, the LSR counter is again cleared. The sequence then follows steps 177 and 178 to 187. Since MPUY STAT A has been reset, count or time tally step 188 is performed; the timing loop has been started for measuring from EOR 21 to the first occurring positive-going transition. The timing loop first portion consists of repeating steps 177, 178, 187, and 188 until the tachometer signal goes negative as indicated by detecting a binary 0 in step 178.

Next, the second portion of the timing loop corresponding to a negative half cycle of signal 36A is performed. Step 179 is first performed. Since STAT A had been reset just before transferring the byte of data to MPUX, the program branches to step 189 preparing for the transfer of a byte of data at the next detected positive transition of the tachometer signal 36A. Count step 188 is performed; and the count loop second portion is a repetition of steps 177, 178, 179, and 188.

Upon detection of a positive transition by the tachometer signal being a 1 in step 178, 187 is again performed; and step 190 is performed transferring the byte of data to MPUX and resetting STAT A.

From the above description, it is seen that steps 187, 179, and 189 perform a program toggle which follows the polarity of a tachometer signal as detected in step 178. Similar arrangements are later referred to as a "-toggle program step."

Upon detection of BOR, the IBG latch (not shown) in data flow circuits 13 (FIG. 2) is reset. Detection of BOR 22 (IBG = 0) completes the IBGM. MPUY sets STAT D to indicate such completion to MPUX. Then, in the next time through the second portion timing loop in step 177, the counting loops, as above described, are terminated by exiting to step 191 wherein STAT A and LSR STAT A image are reset. Then, in step 196, MTU stops; and MPUY waits MPUX.

In measuring IBG 25 with tachometer signal 36B, the second portion of the timing loop only is used to generate counts in step 188. Operation is as above described.

The rate of counting in step 188 is determined by the elapsed time of each timing loop repetition. Accordingly, the first and second loop portions must require the same elapsed machine time. For example, if each machine cycle (step or portion of a step in the FIGS. 6X and 6Y flow charts) takes 200 ns (0.2 microsecond), five machine cycles represent a counting rate of one megahertz. Assuming a 200 ips MTU having a 500-line tachometer, the DESIGN period of one tach signal 36A at 200 ips is about 50 microseconds, or 50 times the time quantum of counter 188. The measurement improvement afforded by the method of this invention bears a relationship to the ratio of time quantum of counter 188 to the tach signal 36A/B period. For a given machine cycle, at low velocities, this improvement is more apparent than at the higher media velocities. Also, the shorter the design or specified IBG, the greater the percentage improvement in precision of measurement, hence, the more important the invention is to measuring MTU performance.

An alternative IBGM is to exit step 190 to step 175. In this arrangement, all 0's are repeatedly transferred to MPUX until the first positive-going transition. Counting is then in phase with the tachometer signal with the first portion of the IBGM being discarded.

The corresponding MPUX program for transferring the measured bytes to each CPU is in sub-sequence 191 of FIG. 6X. MPUX coordinates with MPUY in transferring bytes of data to CPU. After setting up MPUY in program 158, MPUX waits for TAPE OP in wait loop 160. TAPE OP is a branch condition signal generated in MTU in a known manner and lodged in CU 11 indicating that MTU is operating.

MPUX, is program 191, transfers data to CPU and monitors MPUY operation. First, the microprogram sets MPUX STAT B in step 192. It then performs an MPUY STAT B program toggle step at 193. MPUX wait loops over line 193A until STAT B is toggled by MPUY: MPUX then proceeds to step 194. Remember, when the byte was just transferred to MPUX, MPUY STAT B was toggled in step 190 (FIG. 6Y). Wait loop 193A may correspond to count loops 188, 177, 178, and 179 in FIG. 6Y.

In step 194, MPUX verifies that the count between two successive positive transitions in tach signal 25 is not excessive, MPUX microprogram 191 checks for STAT D of MPUY at step 200. If STAT D is set, MPUY is informing MPUX that its operation has been completed. In the event STAT D is set, MPUX exits to termination routine 130 (FIG. 5).

If STAT D is not set, which is the initial situation, two bytes of data received from MPUY are transferred to CPU via CBO in steps 201 and 202 (FIG. 6X). Because of the maximum distance between two successive positive transitions at the start of the later-described tests, two bytes of data are required to ensure that the modulus of the count is not exceeded. The transfer of the byte to CBO, and thence CPU, is in accordance with known SVCO/SVCI control signal changing techniques. After the bytes have been transferred, MPUX checks for CMDO at step 203. CMDO received from CPU indicates that IBGM is to be terminated. (Detection of BOR 22 also terminates IBGM; see step 196 in FIG. 6Y.) When CMDO is received, MPUX exits to STOP routine at 204. This routine is an end-up type of operation not further described. Referring back momentarily to FIG. 6Y, MPUY will stop the MTU as soon as IBGM has been completed. This action is independent of MPUX. In the event CPU desires to abort IBGM, CMDO being received early causes MPUX to indicate STOP to MPUY in accordance with known and previously described operations.

Usually, CMDO will be 0 (not CMDO) such that MPUX repeatedly re-enters program 191 at step 192.

TAPE SLIP MEASUREMENTS

The preferred present method of measuring tape slip is performed in three parts. One measurement is an IBGM as just described. The other two parts, TS-1 and TS-2, measure tape displacement during deceleration and acceleration across the same IBG. In part TS-1, upon detection of EOR 21, the MOVE tag to MTU is dropped stopping the tape along velocity profile 27. This is accomplished by MPUX setting its STAT D as will be described. After stopping the tape, CPU commands another measurement, TS-2, during tape acceleration. The tape is accelerated from "stop" in the middle of the IBG until BOR 22 is detected or until design velocity 26 is reached. During TS-1 and TS-2, the tachometer pulses are counted together with the end measurements between EOR and the first positive transition and BOR and the last positive transition in the IBG as above described for IBGM at design velocity 26. It should be noted that the velocity variations of the tape do not affect the tachometer.

Because of the relatively low velocity near the stopping point in the IBG, to ensure that the modulus of the count is not exceeded, two bytes (16 bits) of count data are required. After all three measurements have been taken, the IBG length is calculated based upon measurement No. 1, the IBGM, and upon Ts-1 and TS-2. The difference between IBGM and the sum of TS-1 and TS-2 is a quantitative indication of actual tape slip during one deceleration and one acceleration. It should be noted that if there is tape slip during constant velocity transporting of the tape, the indicated slip is in addition to tape slip during constant velocity operation.

The above-described measurements are made easily with present-day tape subsystems. As will be explained later, other forms of tape slip measurements can be effected while still practicing the present invention. While tape slip during deceleration is not separately identified from tape slip during accelerating, the quantitative measurement is sufficiently accurate and repetitive such that a tape slip problem is readily identified within a given MTU. The degree of tape slip which can be measured against predetermined specifications can be ascertained and indicated whether or not a capstan tape-engaging surface should be replaced. Also included in the measurement, in the event of a defective media, is the effect of stretching the media during acceleration. However, this to date has not been a serious enough problem to warrant special diagnostics.

The CPU program for effecting tape slip measurement is shown and described with respect to FIG. 7. It should be noted that the illustrative program is greatly simplified for more clearly bringing out the principles of the present invention and is described first to make an easier understanding of the detailed description of CU 11 microprograms and their cooperative relationships between the MTU and the controlling CPU. The FIG. 7 illustrated CPU program is reviewed with the positional relationships between the tape and the read/record head. CPU may be an IBM 360 or 370 computer, for example, operating with OS-360 or OS-370. A diagnostic program represented in FIG. 7 is a portion or segment of a peripheral diagnostic program callable into CPU by OS-360. Once resident within CPU core, the FIG. 7 illustrated segment of a diagnostic program is entered at 350 using known OS-360 techniques. At 351, CPU sets diagnostic mode in CU 11. This is accomplished by CPU generating a code permutation indicating diagnostic mode; then, supplying same over CBO to CU 11 concurrently with a CMDO tag line being active. CU 11 responds to the code permutations on CBO and the CMDO tag to set the diagnostic mode flags in LSR 75 in MPUX and MPUY as well as latches (not shown) indicating diagnostic mode.

Upon setting diagnostic mode CU 11 is chained to CPU for ensuring no interruption of the diagnostic procedure nor any attempted data processing operations. Chaining is a known IBM 360 peripheral subsystem operation. As soon as diagnostic mode is set at 351, CU 11 supplies a SUPPRI over INTFX to CPU indicating that CU 11 is ready for the next command. This latter step moves the system from one step to the next and will not be later described for clarifying the description. At 352, CPU has supplied a second command to CU 11 instructing it to move tape in the addressed MTU to load point, the beginning of tape. At the end of the move, tape 180 is positioned with respect to the transducer as shown in the first and top diagrammatic figure portion of FIG. 7. At this time, MTU informs CU 11 that load point has been reached by sending a DEVICE END signal to CU 11. CU 11 responds to the DEVICE END (DE) by sending a second SUPPRI signal to CPU. CPU now knows tape 180 is at load point and CU 11 is ready to receive and act on the next command indicated in the diagnostic program segment.

At 353, CPU commands CU 11 to write two pseudo records on tape 180. The length of these records is indicated to CU 11 by a CCW (channel control word) supplied over CBO. In the particular illustration, the two records each contain 250 bytes—record A being close to load point and record B being a downstream record.

Then, at 354, CPU commands CU 11 to move the tape back to load point as shown in the third diagram in FIG. 7. Note that records A and B are downstream from the head position. At 355, CPU commands CU 11 to measure one IBG or perform one IBGM. The procedure above described with respect to FIGS. 6X and 6Y in the forward direction is performed. Data acquired during IBGM is transferred to CPU during this step as above described. As soon as tape reaches the position shown in the fourth diagrammatic figure portion (the read gap is in downstream IBG 185A), CU 11 requests the next command to be issued by CPU.

At 356, CPU commands CU 11 to move tape backward by two records. This causes the tape to be moved to a position similar to that shown in the third diagrammatic figure portion. However, in response to this command, tape will not be quite moved to LP because of the usual distance between record A and LP according to the American standard tape recording formats. However, the measurement just made in step 355 could be in the middle of the tape as opposed to the beginning of tape. This may be desired in order to bring in variations of tape distribution between the two reels into the diagnostics.

As soon as the tape is repositioned, CPU commands CU 11 at 357 to perform TS-1. This is interpreted by CU 11 to move the tape over record A and, upon detection of EOR 21, to drop the MOVE tag to the addressed MTU such that the velocity profile 27 is followed and the tape stopped with the read gap approximately centered within the IBG 185 (IBG 25 in FIG. 1). The CU 11 response to this command will be described with respect to FIG. 6X, and the MPUY portion is described with respect to FIG. 6Y. Upon completion of this step, CPU commands CU 11 at 359 to perform TS-2 in the forward direction which follows velocity profile 28 to BOR 22. Tape 180 is moved until the read gap is positioned in IBG 185A as shown in the fourth diagrammatic figure portion.

The IBG 185 has now been measured once at a constant velocity by IBGM at 355 and once during one deceleration and one acceleration in steps 357 and 359. At 360, CPU calculates the first IBGM to get distance IBG-1 indicating the precise length of IBG 185. Following this calculation at 361, CPU calculates the second IBGM performed in steps 357 and 359 to get a second length IBG-2. Then, at 362, CPU calculates the difference between IBG-2 and IBG-1 to get a quantitative indication of tape slip on the addressed MTU in the forward direction. If it was desired to measure tape slip only in the forward direction, at the conclusion of step 359, CPU would have disconnected CU 11 and permitted it to be accessed by other CPU's or for performing data processing operations with another MTU. However, in the present illustration, it was desired to measure tape slip not only in the forward direction but also in the backward direction.

To measure tape slip between record blocks A and B, CPU commands a backward TS-1 and TS-2 at 363. CU 11 responds by causing MTU to move tape from IBG 185A, record block B, past the head, dropping MOVE at point 363A, which is the beginning of IBG 185 in the backward direction. Deceleration follows curve 27 of FIG. 1 with the tape stopping with the read gap located in IBG 185. Measurement of the distance from 363A to point of stopping is as above described for the IBGM in the forward direction. Upon stopping the tape, CU 11 informs CPU that it is ready for the next command. CPU then, at 364, commands a backward TS-2 distance measurement. MTU starts the tape in the backward direction continuing TS-2 until the BOR of record A at 364A is encountered. Tape continues to move until the read gap reaches upstream end of record A or load point, as may be desired. CPU now has all of the data necessary to measure tape slip in the backward direction. At 365, it calculates the backward IBG by summing the distance measured in steps 363 and 364 for calculating length IBG-3. Tape slip in the backward direction is quantized at 366 by subtracting IBG-1 from IBG-3. Further diagnostic analysis may be performed by comparing the forward tape slip to the backward tape slip and the like. Additionally, subsequent diagnostic procedures may cause the MTU to move the tape such that one-half of the tape is on each of the spools. Then, diagnostic IBG measurements are made in the manner above described. Also, it may be desired to perform the diagnostics with most of the tape on the machine reel, i.e., the tape adjacent the transducer is toward what is termed the end of the tape (EOT). A succession of operations may be performed to provide complete diagnostic information for MTU performance analysis.

Referring now more particularly to FIG. 6X, the TS-1 and TS-2 microprogram portions are described. MPUX performs the coordination function between MPUY and CPU. For TS-1, decode command step 156 causes the microprogram to exit over line 247 to the set MPUX-D in step 248. Setting MPUX-D by MPUX tells MPUY to drop the MOVE tag to the addressed MTU upon detection of EOR 21. This action causes MTU to stop the tape along velocity profile 27 of FIG. 1. After executing step 248, the MPUX microprogram enters line 157, which is the above-described IBGM microprogram.

Upon entering stop routine 204, CPU learns from CU 11 that the distance measurement has been completed from EOR 21 to the point of the tape stop in the IBG. CPU then commands CU 11 to perform distance TS-2. This command is decoded at 156 for entering program 251. MPUX step 255 initializes the MPUY microprograms by setting MPUX STAT C and loading command TS-2 into exchange register XA. MPUX then directly enters microprogram segment 191 at step 193, the MPUY-B toggle sense step. Program 191 is repeated for sending data to CPU from MTU as above described for IBGM and finally enters stop routine at 204 which tells CPU that step 359 (FIG. 7) has been completed.

Referring next to FIG. 6Y, the MPUY portions of functions TS–1 and TS–2 are described. The TS–1 enters the IBGM microprogram as previously described. At decision step 228, MPUY senses for MPUX-D. If it is set to a binary 1, function TS–1 is indicated. MPUY then drops the MOVE tag at 230. Remember, EOR 21 has been sensed at 165 before MPUY senses for MPUX STAT D. After dropping the MOVE tag at 230, MPUY returns to the IBGM program and meters distance until the tape comes to a complete stop. When MTU has stopped the tape, it supplies a DEVICE END to CU 11. This signal is sensed by CU 11 in step 236. If DEVICE END is received, MPUY sets its STAT D at 237 and then waits MPUX at 238. Remember, in FIG. 6X at step 200 MPUX senses for MPUY STAT D and, if set, goes to termination routine as previously mentioned. This informs CPU that the addressed MTU has stopped the tape, and the subsystem is ready for the next command, i.e., function TS–2 is ready to be performed.

MPUY responds to the TS–2 command code in register XA to perform steps 260 and 261. In step 260, MPUY determines what recording format is to be used in the addressed MTU, i.e., PE or NRZI. Additional recording formats may be used. In any event, the flag set in LSR 75 of MPUY causes MPUY to set the PE or NRZI mode in the MTU in accordance with known techniques. Then, in step 261, tape operation mode is activated in the addressed MTU; and the MOVE tag is raised for causing the MTU to move the tape in the direction indicated. This is done by known commands to the MTU from the CU not pertinent to an understanding of the present invention. Then, MPUY enters the IBGM program at step 175.

It may be noted that in going from TS–1 to TS–2 the counter in MPUY holds elapsed time between successive tachometer transitions in order to compute the average velocity of full-cycle tachometer cycles and was not cleared upon initiation of TS–2. Therefore, if the tape was stopped between tachometer transitions, the count would be transferred from TS–1 to TS–2. In the alternative, the count could be transferred upon DEVICE END at step 236 and a new count started for TS–2 by clearing the counters in step 261. Even though there is a great variation in velocity in TS–1 and TS–2 portions of the tape slip measurements, the average velocity will still provide a reasonable degree of precision in measuring the IBG length absent any tape slip.

REEL-TO-REEL TAPE DRIVE IBGM AND RELATED MEASUREMENTS (FIGURE 9)

In some reel-to-reel tape drives, there is no capstan associated with transporting media 270 across read/write/erase transducer 371. In such systems, which may be more sensitive to degradation of control circuits than a vacuum-column single-capstan transport described with respect to FIG. 4, more elaborate diagnostic procedures may be desired. Tape slip measurements as described for FIG. 4 are not used. In FIG. 9, drive control system 372 can be mathematically modeled with the drive performance analysis measurements made in accordance with the present invention being compared with the mathematical model for analyzing degradation. The reason for this is that control 372 may contain a large plurality of feedback loops which interact in nonlinear manners. A mathematical model may be the only suitable way of analyzing tape drive performance. The FIG. 9 illustrated embodiment is simplified to the extent necessary to show how the combination of motion-indicating signals with readback signals can be used for IBGM and tape slip measurements in a complex control environment.

Magnetic media 370 is selectively transported between first and second reels 373 and 374 without intermediate buffering loops of any significance. In order to ascertain media 370 velocity over head 371, a clock, sprocket, or synchronization track 375 is recorded along the center of the media at the time of manufacture and is never changed in any subsequent tape processing. One of the gaps in head 371 senses the recorded signal in track 375 and supplies same to clock 376 for feedthrough to motor control 372. Motor control 372 is responsive, inter alia, to the sprocket signals for controlling media velocity past transducer or head 371. In this sense, the sprocket track 375 signals favorably compare with the digital tachometer signals supplied over line 36 in the FIG. 4 illustrated tape drive system. Accordingly, clock 376 supplies its sprocket signals over line 377 to other controls 378. These other controls, when compared with the FIG. 1–11 embodiments, include CU 11 and CPU, as well as the functional controls or control logic 112 (FIG. 4), etc.

Other controls 378 combine the readback and displacement-indicating (sprocket or tachometer) signals as described for the FIG. 4 illustrated drive—that is, signals read from media 370 are supplied through read circuits 380 to other controls 378 to be combined with track 375 sprocket signals for analyzing tape drive performance. With the formats described in the USA standards referenced at the beginning of this description, tape drive performance (tape slip) is subject to the same type of analysis as described for the FIG. 4 illustrated embodiment and for the diagnostics and other analytical procedures discussed above.

Additionally, the performance of the drive system for reels 373 and 374 is of increasing importance. In this regard, a pair of reel drive motors 380 and 382 have tachometers 383 and 384 generating digital signals as described for tachometer 109 of FIG. 4. These tachometer signals are supplied not only to motor control 372 for velocity and displacement controlling in the same sense as for the FIG. 4 embodiment, but also to other controls 378 for further combining with the readback signals supplied from circuits 380 plus the sprocket signals from track 375. It is appreciated that the CPU program and the microprograms in CU 11 will have to be more complex to accommodate these additional variables. Particularly, the mathematical model of motor control 372 preferably is lodged in a program within CPU for analyzing performance and indicating degraded performance areas. For example, in the FIG. 9 illustrated drive, the torque relationships between the reel motors may be analyzed during acceleration and deceleration by combining the signals as set forth herein. Such measurements are substituted for tape slip measurements when a capstan is not used. Of course, when a capstan is provided, tape slip may again be analyzed.

Other controls 378 have write circuits 387 to record signals on tape 370.

In analyzing performance of the FIG. 9 illustrated drive in accordance with the present invention, the procedure set forth with respect to the capstan pulses from FIG. 4 is comparable with the sprocket signals from track 375. Additionally, similar diagnostics can be performed by combining tachometer signals from take-up reel 374 tachometer 384 with the readback signals. Similarly, for the pay-out reel 373, tachometer 383 signals are combined with readback signals for that portion of the drive. Accordingly, not only is the mathematical model of motor control 372 important in generating tape drive performance measurements, but also selected portions of the drive with respect to readback signals on the tape are separately analyzed. Pseudo records can be written on media 370 for analyzing reel-to-reel performance. Such further diagnostics are not included in this description as many reel-to-reel drives will vary substantially with the principles of the invention being practiced by a thorough reading and study of the present description.

SOME ALTERNATE METHODS OF IBGM, TAPE SLIP, AND OTHER MEASUREMENTS

Referring firstly to FIG. 10, a method of separately measuring deceleration/acceleration distance which may include tape slip determination is described. The flowchart is greatly simplified with the understanding that the techniques and methods aforedescribed are useful to accomplish the results set forth in FIG. 10. The flowchart represents functions interchangeable between CPU and CU 11 in order to describe the functions performed by the subsystem in combination with the CPU and do not necessarily relate to CPU channel command microprogram functions, per se, and the like. The previous description should fit into the FIG. 10 description sufficiently well that one skilled in the art can translate the FIG. 10 flowchart into usable form in many data processing arrangements.

The first step 400 starts the tape. After the tape has started in the desired direction and diagnostic mode has been set in CU 11, an all 1's write is performed at 401. In most tapes, the erase condition is a so-called binary 0 state. The pseudo records can be a DC "1" write over the erase state, the flux changes at 402 to generate a pseudo block 403 and the MOVE tag having been activated before the write is started. The velocity 406 is at the desired velocity. After a predetermined number of bytes (in a multitrack system, a bit position in each of several tracks is termed a byte) have been recorded in pseudo record 403, CU 11 stops the writing upon completion of the byte count at 409 by dropping the MOVE tag at 405 and instituting in response to CPU an IBGM for metering the distance past point 404 on the tape. Velocity drops until the tape stops at 407. At this time, the addressed MTU supplies a DEVICE END signal to CU at 408 which then is transferred to CPU by CU 11. CPU responds at 410 instructing CU 11 to simultaneously raise the MOVE tag at 411 for starting the tape and simultaneously in the diagnostic mode starting writing at 412. The envelope or beginning of record at 412 is representative of the stop portion of the addressed MTU. A second pseudo record is then written. STAT Simultaneously with raising MOVE and starting a write, a second IBGM instruction is given to CU 11. This will be a reverse instruction; that is, the distance from start at 407 or BOR 412 until EOR 418 will be metered rather than the IBG distance. Suitable modification of the micros can be made by substituting EOR for BOR and vice versa.

In the FIG. 10 illustrated method, it is desired to meter distance until the tape in the addressed MTU reaches design speed. Speed is detected at step 414, the microprogram idling until design speed is reached. Speed or velocity is detected by metering the elapsed time between successive positive transitions of tachometer signals. When the elapsed time reaches a predetermined minimum such as 50 microseconds, then CU 11 indicates tape is moving at the desired speed. Note that tape slip is ignored. Upon detection of this tachometer frequency, writing is stopped at 417 generating EOR 418. At the same time, a known go-holdover function is performed. This function causes the MTU to maintain the velocity for a preset time in accordance with known techniques. Accordingly, the go-holdover portion 419 of the MOVE indicated by the dotted line is usually performed within the MTU by a logic circuit (not shown nor described).

At the end of the go-holdover, which maintains a constant velocity at 420, the tape is stopped in step 425. As soon as the tape is completely stopped, a second DEVICE END is supplied to the CPU.

The CPU responds at this time by initiating step 426, backward space two records, or BSR two records. Tape moves backward over both records such that the tape is positioned with respect to the read transducer upstream from BOR 402. Then, a forward IBGM is performed at 427. Tape is moved with the first record 403 being sensed. Upon detection of EOR 404, an IBGM is initiated which accurately meters the distance to BOR 412. It will be remembered that in IBGM, the tape is moved across the next downstream record such that it can be positioned adjacent the transducer in the downstream IBG. However, upon detection of BOR 412, a forward record command is executed by CU 11. This can be accomplished by a channel command or CCW as aforedescribed. In step 428, CU 11 meters the distance between BOR 412 and EOR 418 and transfers the data to CPU. Upon detection of EOR 418, the tape is stopped as aforedescribed; and CU 11 will await further instructions from CPU.

The CPU has all of the data metered in the four measurements made—the deceleration distance between EOR 404 and BOR 412, the acceleration distance between BOR 412 and EOR 418. The number of tachometer cycles and the apparent distance of these two measurements are calculated as above described. After the backward space two records, the IBG between 404 and 412 is metered at full velocity. This gives a precise actual distance between EOR 404 and BOR 412. The difference is then calculated between the apparent deceleration distance and the actual deceleration distance for determining tape slip during deceleration. In a similar manner, the measurement of the record or block length between BOR 412 and EOR 418 is a precise actual distance on the tape, while the apparent acceleration distance is calculated and the difference between the two measurements indicating tape slip during acceleration.

The above-described measurements may be repeated for a plurality of blocks and for different distributions of tape in tape storage reels in order to more fully analyze tape performance in generating IBG's, deceleration and acceleration. Also, note that record lengths actually occupied on the media are easily measured using the present invention. In the alternative, acceleration can be measured by positioning the tape at 407 and recording a record until tape is stopped. The write circuits are then turned off and not turned on until tape has reached the desired velocity, at which time another record is recorded. A backward space two records may be executed with the IBG formed as a result of the acceleration distance being measured at full velocity as described with respect to step 427 for the deceleration measurement.

Based upon device characteristics and tape path organizations, various other methods can be used for determining various factors using the principles of the present invention. The recording of records or marks on the media during some portion of the record may be desirable in order to reduce time required to perform the diagnostics by the CU and the MTU. In any event, most of the operations as described herein can be performed in a free-standing manner by a combination of CU 11 and the addressed MTU, leaving the CPU to do other data processing operations. Such concurrent operations reduce the total diagnostic cost while still permitting rapid and accurate diagnostic measurements. Most of the diagnostic operations are preferably performed while the CU is chained to the CPU such that the channel interconnecting the CPU and the CU will ensure prompt response for performing diagnostics in a facile manner.

While preferred embodiments of the invention have been shown and described herein, it is to be understood that the invention is not limited to these embodiments or their details, and that departures may be made therefrom within the spirit and scope of the invention as defined in the appended claims.

What is claimed is:

1. The method of making precise total distance D measurements between two marks on an article by effecting relative motion between said article and a transducer for sensing the marks and simultaneously and asynchronously metering the distance of the relative movements with the velocity of the relative motion possibly being subject to variations;

said distance indication being electrically represented by a succession of predetermined transitions between different electrical states; including the following steps:

metering time $T_0$ between a first mark and a first-occurring transition and then successively and repeatedly metering time between successive K number transitions, summing elapsed time $T_x$ as the summation signal:

$$\sum_{1}^{K} T,$$

where T is the elapsed time between successive ones of transitions, and finally metering time $T_{K+1}$ between the last transition and the second mark;

generating signals representative of all of said times and logging same; and determining the distance $dK$ between two successive transitions and then in a digital computer solving the equation:

$$D = dk \{ K [ (T_0 + T_{K+1})/T_x ] + K \} .$$

2. The method set forth in claim 1 wherein said time metering includes using a periodic signal generator having a periodicity substantially less than expected elapsed time between two of said predetermined transitions and register means for accumulating digital representations of the number of counts between said transitions.

3. The method set forth in claim 1 wherein the distance indication is represented by succession of squarewaves with said ones of transitions being of all the same direction of change and during each said measurement holding said relative motion at a substantially constant velocity.

4. The method including making a first measurement as set forth in claim 1 and also making a second measurement while substantially altering the velocity in accordance with predetermined criteria and then subsequently comparing the two distance D measurements for evaluating relative motion during constant velocity and during changing velocity.

5. The method set forth in claim 4 wherein one of said articles is a magnetic tape and a second article is a tape-moving member engaging the tape for transport, said transducer being spaced from the tape-moving member and being in cooperative relationship in the tape for sensing magnetic marks thereon and further including tachometer means on said tape-transporting member for indicating displacement of the member and supposed displacement of said tape, the improved method further including:

transporting said tape past the transducer by rotation of said member at a relatively constant velocity such that said marks are sensed by said transducer and simultaneously metering member movement; and subsequently varying the velocity of said tape-transporting member in decelerating/accelerating modes and simultaneously metering the distance between said marks and then comparing metered distance as indicated by the two modes of operation and indicating tape slip with respect to said member during accelerating/decelerating modes in accordance with differences in said measurements.

6. The method set forth in claim 5 wherein said first and second marks are pseudo records recorded on the tape by said transducer each having EOR and BOR end portions, moving the tape in the first direction substantially at constant velocity past the transducer, sensing EOR of the first record, metering the tape transport until detection of BOR of the second record both under constant velocity, and in deceleration/acceleration modes in both directions of motion and comparing the acceleration/deceleration modes in both directions with the distance indicated by the constant velocity measurement and indicating tape slip in both directions of motion in accordance with said measurement.

7. The method including recording said first mark on a magnetic member while transporting said magnetic member at a substantially constant velocity, stop the recording, and then substantially simultaneously decelerating the tape to a stop condition and recording said second mark after said tape has been stopped, and subsequently measuring the distance between said marks recorded in the above-described manner as set forth in claim 1.

8. Transport performance measurements wherein relative motion is effected between an article and a member with relative motion being indicated by transitions between electrical states of an electrical signal, each distance between two successive predetermined ones of said transitions representing a predetermined and relatively fixed distance, said transitions and said relative motions being asynchronous, said article having first and second marks thereon and said transport having means for sensing said marks when in a predetermined relationship to said member;

effecting relative motion and sensing said electrical transitions during said motion;
including the following steps:
upon sensing a first of said marks, metering time in small increments until detection of a first one of said transitions, logging said time;
repeatedly metering time between successive ones of said transitions and logging same; and
finally, metering time between a last one of said transitions and said second mark, then in a digital machine computing the average time between two successive ones of said transitions as being representative of actual distance of relative motion between two of said transitions in the time domain, then dividing the partial metered times by said average time and summing the quotient with the number of transitions, and finally multiplying distance of relative motion between two successive ones of said transitions.

9. The method set forth in claim 8 wherein said article is a flexible magnetic media and said member is a transducer capable of sensing and recording electrical signals on, to, and from said media and further means driving the tape in either direction across said transducer and displacement-indicating means in said driving means generating said transitions, the method further including:
causing said media to be transported across said transducer and recording a pseudo record set of signals on said media and establishing reference points with respect to said pseudo record and metering distance between said reference points in accordance with claim 8.

10. The method set forth in claim 9 wherein said media is transported at a relatively constant velocity between all of said reference points both during recording and measurement.

11. The method set forth in claim 10 wherein said media is transported past said transducer after recording of said marks at least twice, a first one in accordance with claim 10 and a second time wherein the velocity is subjected to deceleration/acceleration modes for indicating media slip during such modes with respect to transport of the media at substantially constant velocity.

12. The method set forth in claim 11 further including reversing the direction of motion from said measurements and subjecting said media to deceleration/acceleration motions between at least two of said reference points for ascertaining media slippage in both directions of motion by comparing measurements during said deceleration/acceleration modes with respect to the distance indicated during the constant velocity measurement.

13. The method set forth in claim 12 further including completely stopping the media during said deceleration/acceleration modes.

14. The method set forth in claim 13 wherein an additional reference mark is established while said media is stopped whereby media transport during deceleration or acceleration mode is separately identifiable.

15. Media measurements for indicating distance between two signal portions on said media separated a distance sufficient such that a tachometer indicating displacement of said media is required to cycle through several signal cycles representing displacement, including the following steps in combination:

metering elapsed time from a first signal portion until occurrence of a predetermined displacement signal while transporting said media past a transducer, then storing such elapsed time measurement,
counting displacement signals until detection of said second signal portion,
measuring time between successive ones of said displacement signal while counting said displacement signals,
storing the elapsed time between the last-counted displacement signal and said second signal portion,
computing the average velocity in a digital machine based upon a number of displacement signals and the total measured time between the first and last displacement signal, and
combining said velocity displacement count and said metered time at the end portions adjacent said signal portions and generating signals indicating the distance between said signal portions.

16. The method set forth in claim 15 wherein said media is moved in a forward direction and a pseudo data signal record precedes said first signal portion and succeeds said second signal portion.

17. The method set forth in claim 15 wherein said media measurement is in a direction wherein said pseudo record is disposed between said first signal portion and said second portion such that the length on the media of said record is precisely measured.

18. The method set forth in claim 15 wherein said displacement signal is a periodic square-wave having a periodicity in accordance with the velocity of the media motion with transitions in a given direction being reference transitions and all said time measurements being made with respect to said reference transitions and said signal portions.

19. The method set forth in claim 16 wherein said media is moved between a pair of spools with each spool capable of containing substantially all of said media, initially recording a plurality of pseudo records on said tape each having said signal portions and separated by IBG's bordered by said signal portions,
measuring a selected number of said distances between said signal portions at spaced points along said media such that distribution of the media between said spools is different for each of said measurements and performing such measurements at a relatively constant velocity, and repeating said measurements while subjecting the media to deceleration/acceleration modes between said signal portions being measured and then comparing the indicated displacements between said signal portions during said deceleration/acceleration modes with corresponding measurements made a constant velocity for indicating tape performance at different media distributions between said spools.

20. The method set forth in claim 19 wherein during said deceleration/acceleration modes, a single deceleration and a single acceleration from and to said constant velocity and a stop condition is performed between selected ones of said signal portions.

21. The subject matter set forth in claim 20 wherein said deceleration/acceleration mode is selected such that only deceleration or acceleration is performed between selected ones of said signal portions.

22. The method of claim 21 wherein said signal portions are recorded at least during some of said acceleration or deceleration modes.

23. The method set forth in claim 15 wherein said media transport is a reel-to-reel transport and said displacement-indicating signals are from a tachometer associated with rotation of one of said reels.

24. The subject matter of claim 15 wherein said media transport is a reel-to-reel transport and having a media with a reference track thereon plus an additional track having said signal portions and said measurement including combining said signals from said reference track, said signal portions and a tachometer indicating signal from a driving portion of said transport.

25. A magnetic tape system including a magnetic tape handler having driving means for moving tape past a transducer and the transducer capable of exchanging signals with the tape, a tachometer in the driving means indicating driving means operation and producing a series of signal-state changes indicative of displacement, programmable control circuit means operatively associated with said transducer and said driving means and including program means for establishing data signals, IBG's, and control signals on said tape and receiving said signal-state changes from said driving means and being further operative to effect detection of said signals on said tape while transporting the tape by said driving means, and said program means being jointly responsive to signals from said tape and said signal-state changes for evaluating performance of said tape transport in that distances between said data signals forming an IBG are precisely measured by counting said transitions and metering elapsed time between data signals and predetermined ones of said transitions and including means combining said counts with elapsed times for indicating actual IBG length.

* * * * *